(12) United States Patent
Zacharias et al.

(10) Patent No.: US 10,159,107 B2
(45) Date of Patent: Dec. 18, 2018

(54) TECHNIQUES FOR MANAGING DUAL CONNECTIVITY IN AN UPLINK

(71) Applicant: QUALCOMM Incorporated, San Diego, CA (US)

(72) Inventors: Leena Zacharias, San Jose, CA (US); Srinivasan Balasubramanian, San Diego, CA (US); Vanitha Kumar, San Diego, CA (US); Shailesh Maheshwari, San Diego, CA (US); Aziz Gholmieh, Del Mar, CA (US); Sitaramanjaneyulu Kanamarlapudi, San Diego, CA (US); Uppinder Babbar, San Diego, CA (US); Yue Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/675,499

(22) Filed: Aug. 11, 2017

(65) Prior Publication Data

US 2018/0220470 A1 Aug. 2, 2018

Related U.S. Application Data

(60) Provisional application No. 62/453,494, filed on Feb. 1, 2017.

(51) Int. Cl.
*H04L 12/28* (2006.01)
*H04W 76/15* (2018.01)
(Continued)

(52) U.S. Cl.
CPC .......... *H04W 76/15* (2018.02); *H04L 5/0098* (2013.01); *H04L 5/001* (2013.01); *H04L 49/90* (2013.01); *H04W 76/12* (2018.02); *H04W 76/28* (2018.02)

(58) Field of Classification Search
USPC ........................................ 370/252, 329, 430
See application file for complete search history.

(56) References Cited

U.S. PATENT DOCUMENTS

| 9,578,671 | B2 * | 2/2017 | Blankenship | ....... H04W 76/025 |
| 2017/0071023 | A1 * | 3/2017 | Kunz | .................. H04W 76/025 |

(Continued)

FOREIGN PATENT DOCUMENTS

WO    WO-2016133123 A1    8/2016

OTHER PUBLICATIONS

Ericsson: "Tight Integration of NR and LTE: User Plane Design", 3GPP Draft; R2-164027—Tight Integration of NR and LTE—User Plane Design, 3rd Generation Partnership Project (3GPP), Mobile Competence Centre; 650, Route Des Lucioles; F-06921 Sophia-Antipolis Cedex, vol. RAN WG2, No. Nanjing, P.R. China; May 23, 2016-May 27, 2016, May 22, 2016 (May 22, 2016), 4 Pages, XP051105357, Retrieved from the Internet: URL: http://www.3gpp.org/ftp/Meetings_3GPP_SYNC/RAN2/Docs/ [retrieved on May 22, 2016] the whole document.

(Continued)

*Primary Examiner* — John Pezzlo
(74) *Attorney, Agent, or Firm* — Holland & Hart LLP

(57) ABSTRACT

A first method includes transmitting, to a network, an indication of a capability to operate in an uplink aggregation dual connectivity mode or in a fast switching dual connectivity mode; and receiving, from the network, a dual connectivity configuration for the UE based at least in part on the indication of the capability. A second method includes communicating with a first network access device; transmitting, to a second network access device, a request to perform fast switching from the first network access device to the second network access device; receiving, from the second network access device, a dual connectivity configu- (Continued)

ration for communicating with the second network access device; and communicating with the second network access device based at least in part on the dual connectivity configuration.

28 Claims, 16 Drawing Sheets

(51) Int. Cl.
*H04L 5/00* (2006.01)
*H04J 1/16* (2006.01)
*H04L 12/861* (2013.01)
*H04W 76/28* (2018.01)
*H04W 76/12* (2018.01)

(56) References Cited

U.S. PATENT DOCUMENTS

2017/0164281 A1* 6/2017 Chiba .................. H04L 5/0032
2017/0303182 A1   10/2017 Uchino et al.
2017/0303286 A1* 10/2017 Sang .................. H04W 72/085

OTHER PUBLICATIONS

Mediatek: "Dual Connectivity Benefit and Feature Exploration", 3GPP Draft; R2-131167 Dual Connectivity, 3rd Generation Partnership Project (3GPP), Mobile Competence Centre; 650, Route Des Lucioles; F-06921 Sophia-Antipolis Cedex; France, vol. RAN WG2. No. Chicago, USA; Apr. 15, 2013-Apr. 19, 2013, Apr. 6, 2013 (Apr. 6, 2013), 4 Pages, XP050699434, Retrieved from the Internet: URL: http://www.3gpp.org/ftp/tsg_ran/WG2_RL2/TSGR2_81bis/Docs/ [retrieved on Apr. 6, 2013] the whole document.
Mediatek Inc: "NR UP Function Split", 3GPP Draft; R2-164896 Disc NR UP Function Split, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016, Aug. 21, 2016 (Aug. 21, 2016), 5 Pages, XP051126576, Retrieved from the Internet: URL: http://www.3gpp.org/ftp/Meetings_3GPP_SYNC/RAN2/Docs/ [retrieved on Aug. 21, 2016] the whole document.
NEC Group: "Physical Layer Aspects for Dual Layer Connectivity in Small Cells", 3GPP Draft; R1-133345, 3rd Generation Partnership Project (3GPP), Mobile Competence Centre; 650, Route Des Lucioles; F-06921 Sophia-Antipolis Cedex; France, vol. RAN WG1, No. Barcelona, Spain; Aug. 19, 2013-Aug. 23, 2013, Aug. 10, 2013 (Aug. 10, 2013), 5 Pages, XP050716464, Retrieved from the Internet: URL: http://www.3gpp.org/ftp/tsg_ran/WG1_RL1/TSGR1_74/Docs/ [retrieved on Aug. 10, 2013] the whole document.
Renesas Mobile Europe: "Discussion on UL Transmission of Dual Connectivity", 3GPP Draft; R2-131175 Discussion on UL Transmission of Dual Connectivity VF, 3rd Generation Partnership Project (3GPP), Mobile Competence Centre; 650, Route Des Lucioles; F-06921 Sophia-Antipolis Cedex, vol. RAN WG2, No. Chicago; Apr. 15, 2013-Apr. 19, 2013, Apr. 6, 2013 (Apr. 6, 2013), 3 Pages, XP050699442, Retrieved from the Internet: URL: http://www.3gpp.org/ftp/tsg_ran/WG2_RL2/TSGR2_81bis/Docs/ [retrieved on Apr. 6, 2013] the whole document.
International Search Report and Written Opinion—PCT/US2018/012991—ISA/EPO—May 17, 2018.
ZTE: "Solutions for Fast Switching in TDD-FDD Joint Operation", 3GPP Draft; R1-134317, 3rd Generation Partnership Project (3GPP), MOBIle Competence Centre; 650, Route Des Lucioles; F-06921 Sophia-Antipolis Cedex; France, vol. RAN WG1, No. Guangzhou, China; Oct. 7, 2013-Oct. 11, 2013, Sep. 28, 2013 (Sep. 28, 2013), pp. 1-2, XP050717461, Retrieved from the Internet: URL: http://www.3gpp.org/ftp/tsg_ran/WG1_RL1/TSGR1_74b/Docs/ [retrieved on Sep. 28, 2013] the whole document.

* cited by examiner

TECHNIQUES FOR MANAGING DUAL CONNECTIVITY IN AN UPLINK

CROSS REFERENCES

The present Application for Patent claims priority to U.S. Provisional Patent Application No. 62/453,494 by Zacharias et al., entitled "Techniques for Managing Dual Connectivity In an Uplink," filed Feb. 1, 2017, assigned to the assignee hereof.

INTRODUCTION

The present disclosure, for example, relates to wireless communication systems, and more particularly to techniques for managing dual connectivity in an uplink.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, new radio (NR), millimeter wave (mmW), or 5G network, a network access device may take the form of a smart radio head (or radio head (RH)) or access node controller (ANC), with a set of smart radio heads in communication with an ANC defining a gNodeB (gNB). A network access device may communicate with a set of UEs on downlink channels (e.g., for transmissions from a network access device to a UE) and uplink channels (e.g., for transmissions from a UE to a network access device).

In some cases, a UE may communicate with more than one network access device—simultaneously or sequentially—in a dual connectivity mode.

SUMMARY

In one example, a method of wireless communication at a UE is described. The method may include transmitting, to a network, an indication of a capability to operate in an uplink aggregation dual connectivity mode or in an uplink fast switching dual connectivity mode; and receiving, from the network, a dual connectivity configuration for the UE based at least in part on the indication of the capability.

In some examples of the method, the uplink aggregation dual connectivity mode or the uplink fast switching dual connectivity mode includes packet data convergence protocol (PDCP) continuity or radio link control (RLC) continuity.

Some examples of the method may include receiving, from the network, a request to perform fast switching from a first network access device to a second network access device, based at least in part on the indication of the capability. In some examples of the method, the request to perform fast switching is received in at least one of: a medium access control (MAC) layer message, radio resource control (RRC) signaling, or a combination thereof.

In some examples of the method, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with a first network access device using a first radio access technology (RAT) and a second network access device using a second RAT (e.g., a different RAT). In some examples, the method may include transmitting a single buffer status report (BSR) over the fast switching bearer to the first network access device and the second network access device.

In some examples the method may include determining a first amount of data to be transmitted to the first network access device and a second amount of data to be transmitted to the second network access device; transmitting a first BSR of the UE over the split bearer, to the first network access device, based at least in part on the first amount of data; and transmitting a second BSR of the UE over the split bearer, to the second network access device, based at least in part on the second amount of data.

In one example, an apparatus for wireless communication at a UE is described. The apparatus may include means for transmitting, to a network, an indication of a capability to operate in an uplink aggregation dual connectivity mode or in an uplink fast switching dual connectivity mode; and means for receiving, from the network, a dual connectivity configuration for the UE based at least in part on the indication of the capability.

In some examples of the apparatus, the uplink aggregation dual connectivity mode or the uplink fast switching dual connectivity mode includes PDCP continuity or RLC continuity.

Some examples of the apparatus may include means for receiving, from the network, a request to perform fast switching from a first network access device to a second network access device, based at least in part on the indication of the capability. In some examples of the apparatus, the request to perform fast switching is received in at least one of: a MAC layer message, RRC signaling, or a combination thereof.

In some examples of the apparatus, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with a first network access device using a first RAT and a second network access device using a second RAT (e.g., a different RAT). In some examples, the apparatus may include means for transmitting a single BSR over the fast switching bearer to the first network access device and the second network access device.

In some examples the apparatus may include means for determining a first amount of data to be transmitted to the first network access device and a second amount of data to be transmitted to the second network access device; means for transmitting a first BSR of the UE over the split bearer, to the first network access device, based at least in part on the first amount of data; and means for transmitting a second BSR of the UE over the split bearer, to the second network access device, based at least in part on the second amount of data.

In one example, another apparatus for wireless communication at a UE is described. The apparatus may include a processor and memory in electronic communication with the processor. The processor and the memory may be configured to transmit, to a network, an indication of a capability to operate in an uplink aggregation dual connectivity mode or in an uplink fast switching dual connectivity mode; and receive, from the network, a dual connectivity configuration for the UE based at least in part on the indication of the capability.

In some examples of the apparatus, the uplink aggregation dual connectivity mode or the uplink fast switching dual connectivity mode includes PDCP continuity or RLC continuity.

In some examples of the apparatus, the processor and memory may be configured to receive, from the network, a request to perform fast switching from a first network access device to a second network access device, based at least in part on the indication of the capability. In some examples of the apparatus, the request to perform fast switching is received in at least one of: a MAC layer message, RRC signaling, or a combination thereof.

In some examples of the apparatus, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples of the apparatus, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with a first network access device using a first RAT and a second network access device using a second RAT (e.g., a different RAT). In some examples, the processor and memory may be configured to transmit a single BSR over the fast switching bearer to the first network access device and the second network access device.

In some examples of the apparatus, the processor and memory may be configured to determine a first amount of data to be transmitted to the first network access device and a second amount of data to be transmitted to the second network access device; transmit a first BSR of the UE over the split bearer, to the first network access device, based at least in part on the first amount of data; and transmit a second BSR of the UE over the split bearer, to the second network access device, based at least in part on the second amount of data.

In one example, a non-transitory computer-readable medium storing computer-executable code at a UE is described. The code may be executable to transmit, to a network, an indication of a capability to operate in an uplink aggregation dual connectivity mode or in a fast switching dual connectivity mode; and receive, from the network, a dual connectivity configuration for the UE based at least in part on the indication of the capability.

In some examples of the non-transitory computer-readable medium, the uplink aggregation dual connectivity mode or the uplink fast switching dual connectivity mode includes PDCP continuity or RLC continuity.

In some examples the non-transitory computer-readable medium may be executable to receive, from the network, a request to perform fast switching from a first network access device to a second network access device, based at least in part on the indication of the capability. In some examples of the non-transitory computer-readable medium, the request to perform fast switching is received in at least one of: a MAC layer message, RRC signaling, or a combination thereof.

In some examples of the non-transitory computer-readable medium, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples of the non-transitory computer-readable medium, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with a first network access device using a first RAT and a second network access device using a second RAT (e.g., a different RAT). In some examples, the non-transitory computer-readable medium may be executable to transmit a single BSR over the fast switching bearer to the first network access device and the second network access device.

In some examples the non-transitory computer-readable medium may be executable to determine a first amount of data to be transmitted to the first network access device and a second amount of data to be transmitted to the second network access device; transmit a first BSR of the UE over the split bearer, to the first network access device, based at least in part on the first amount of data; and transmit a second BSR of the UE over the split bearer, to the second network access device, based at least in part on the second amount of data.

In one example, a method of wireless communication at a first network access device is described. The method may include receiving, from a UE, an indication of a capability to operate in an uplink aggregation dual connectivity mode or in a fast switching dual connectivity mode; determining a dual connectivity configuration for the UE based at least in part on the indication of the capability; and transmitting the dual connectivity configuration to the UE.

In some examples of the method, the uplink aggregation dual connectivity mode or the uplink fast switching dual connectivity mode includes PDCP continuity or RLC continuity.

Some examples of the method may include transmitting, to the UE, a request to perform fast switching to a second network access device. In some examples of the method, the request to perform fast switching is transmitted in at least one of: a MAC layer message, RRC signaling, or a combination thereof.

In some examples of the method, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples of the method, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with the first network access device and a second network access device. In some examples the split bearer or the fast switching bearer may be associated with the first network access device using a first RAT and the second network access device using a second RAT (e.g., a different RAT).

In some examples, the method may include receiving a first BSR of the UE, over the split bearer, at the first network access device (with the first BSR of the UE indicating a first amount of data to be transmitted to the first network access device); and receiving a second BSR of the UE from the second network access device (with the second BSR of the UE indicating a second amount of data to be transmitted to the second network access device). In some examples, the method may include receiving a BSR of the UE over the split bearer or fast switching bearer at the first network access device; and receiving a duplicate of the BSR of the UE from the second network access device.

In one example, an apparatus for wireless communication at a first network access device is described. The apparatus may include means for receiving, from a UE, an indication of a capability to operate in an uplink aggregation dual connectivity mode or in a fast switching dual connectivity mode; means for determining a dual connectivity configuration for the UE based at least in part on the indication of the capability; and means for transmitting the dual connectivity configuration to the UE.

In some examples of the apparatus, the uplink aggregation dual connectivity mode or the uplink fast switching dual connectivity mode includes PDCP continuity or RLC continuity.

Some examples of the apparatus may include means for transmitting, to the UE, a request to perform fast switching to a second network access device. In some examples of the apparatus, the request to perform fast switching is transmitted in at least one of: a MAC layer message, RRC signaling, or a combination thereof.

In some examples of the apparatus, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples of the apparatus, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with the first network access device and a second network access device. In some examples the split bearer or the fast switching bearer may be associated with the first network access device using a first RAT and the second network access device using a second RAT (e.g., a different RAT).

Some examples of the apparatus may include means for receiving a first BSR of the UE, over the split bearer, at the first network access device (with the first BSR of the UE indicating a first amount of data to be transmitted to the first network access device); and means for receiving a second BSR of the UE from the second network access device (with the second BSR of the UE indicating a second amount of data to be transmitted to the second network access device). In some examples, the apparatus may include means for receiving a BSR of the UE over the split bearer or fast switching bearer at the first network access device; and means for receiving a duplicate of the BSR of the UE from the second network access device.

In one example, another apparatus for wireless communication at a first network access device is described. The apparatus may include a processor and memory in electronic communication with the processor. The processor and the memory may be configured to receive, from a UE, an indication of a capability to operate in an uplink aggregation dual connectivity mode or in a fast switching dual connectivity mode; determine a dual connectivity configuration for the UE based at least in part on the indication of the capability; and transmit the dual connectivity configuration to the UE.

In some examples of the apparatus, the uplink aggregation dual connectivity mode or the uplink fast switching dual connectivity mode includes PDCP continuity or RLC continuity.

In some examples of the apparatus, the processor and memory may be configured to transmit, to the UE, a request to perform fast switching to a second network access device. In some examples of the apparatus, the request to perform fast switching is transmitted in at least one of: a MAC layer message, RRC signaling, or a combination thereof.

In some examples of the apparatus, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples of the apparatus, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with the first network access device and a second network access device. In some examples the split bearer or the fast switching bearer may be associated with the first network access device using a first RAT and the second network access device using a second RAT (e.g., a different RAT).

In some examples of the apparatus, the processor and memory may be configured to receive a first BSR of the UE, over the split bearer, at the first network access device (with the first BSR of the UE indicating a first amount of data to be transmitted to the first network access device); and receive a second BSR of the UE from the second network access device (with the second BSR of the UE indicating a second amount of data to be transmitted to the second network access device). In some examples, the processor and memory may be configured to receive a BSR of the UE over the split bearer or fast switching bearer at the first network access device; and receive a duplicate of the BSR of the UE from the second network access device.

In one example, a non-transitory computer-readable medium storing computer-executable code at a UE is described. The code may be executable to receive, from a UE, an indication of a capability to operate in an uplink aggregation dual connectivity mode or in a fast switching dual connectivity mode; determine a dual connectivity configuration for the UE based at least in part on the indication of the capability; and transmit the dual connectivity configuration to the UE.

In some examples of the non-transitory computer-readable medium, the uplink aggregation dual connectivity mode or the uplink fast switching dual connectivity mode includes PDCP continuity or RLC continuity.

In some examples of the non-transitory computer-readable medium, the code may be executable to transmit, to the UE, a request to perform fast switching to a second network access device. In some examples of the non-transitory computer-readable medium, the request to perform fast switching is transmitted in at least one of: a MAC layer message, RRC signaling, or a combination thereof.

In some examples of the non-transitory computer-readable medium, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples of the non-transitory computer-readable medium, the received dual connectivity configuration may be based at least in part on the dual connectivity mode (e.g., an uplink aggregation mode or an uplink fast switching mode), and includes a configuration of a split bearer or a fast switching bearer. The split bearer or fast switching bearer may be associated with the first network access device and a second network access device. In some examples the split bearer or the fast switching bearer may be associated with the first network access device using a first RAT and the second network access device using a second RAT (e.g., a different RAT).

In some examples of the non-transitory computer-readable medium, the code may be executable to receive a first BSR of the UE, over the split bearer, at the first network access device (with the first BSR of the UE indicating a first amount of data to be transmitted to the first network access device); and receive a second BSR of the UE from the second network access device (with the second BSR of the UE indicating a second amount of data to be transmitted to the second network access device). In some examples, the code may be executable to receive a BSR of the UE over the split bearer or fast switching bearer at the first network access device; and receive a duplicate of the BSR of the UE from the second network access device.

In one example, another method of wireless communication at a UE is described. The method may include communicating with a first network access device; transmitting, to a second network access device, a request to perform fast switching from the first network access device to the second network access device; receiving, from the second network access device, a dual connectivity configuration for communicating with the second network access device; and communicating with the second network access device based at least in part on the dual connectivity configuration.

In some examples of the method, communicating with the first network access device may include communicating using a first RAT, and communicating with the second network access device may include communicating using a second RAT (e.g., a different RAT). In some examples of the method, the fast switching includes PDCP continuity or RLC continuity.

Some examples of the method may include communicating with the second network access device based at least in part on: a first PDCP context used while communicating with the first network access device, or a second PDCP context based at least in part on the first PDCP context. In some examples, the method may include communicating with the second network access device based at least in part on: a first PDCP context and sequence numbering, used while communicating with the first network access device, or a second PDCP context and sequence numbering, based at least in part on the first PDCP context and sequence numbering. In some examples, the first PDCP context may include a first PDCP sequence numbering, and the second PDCP context may include a second PDCP sequence numbering based at least in part on the first PDCP sequence numbering.

Some examples of the method may include determining to transmit the request to perform fast switching based at least in part on: an uplink throughput estimation, a downlink throughput estimation, a reference signal receive quality (RSRQ) measurement, a reference signal receive power (RSRP) measurement, a number of hybrid automatic repeat request (HARD) repetitions, a RLC packer error rate (PER), a PDCP PER, an application type, an application metric, historic information on the first network access device or the second network access device, or a combination thereof.

Some examples of the method may include transmitting a BSR to the first network access device or the second network access device. In some examples, the method may include transmitting a zero BSR to the first network access device before communicating with the second network access device. In some examples, the method may include transmitting a BSR with each packet transmission to the first network access device or the second network access device.

Some examples of the method may include transmitting a scheduling request to the second network access device before transmitting the request to perform fast switching with PDCP continuity to the second network access device; and transmitting, to the second network access device, a MAC layer control element (CE) or a MAC layer message indicating that the second network access device should not be in a connected mode discontinuous reception (CDRX) mode during the fast switching.

In some examples of the method, the request to perform fast switching may be transmitted to the second network access device in at least one of a MAC layer CE, MAC layer messaging, RRC signaling, or a combination thereof. Some examples of the method may include receiving, from the first network access device or the second network access device, a request to perform fast switching with PDCP continuity.

In one example, another apparatus for wireless communication at a UE is described. The apparatus may include means for communicating with a first network access device; means for transmitting, to a second network access device, a request to perform fast switching from the first network access device to the second network access device; means for receiving, from the second network access device, a dual connectivity configuration for communicating with the second network access device; and means for communicating with the second network access device based at least in part on the dual connectivity configuration.

In some examples of the apparatus, the means communicating with the first network access device may include means for communicating using a first RAT, and the means for communicating with the second network access device may include means for communicating using a second RAT (e.g., a different RAT). In some examples of the apparatus, the fast switching includes PDCP continuity or RLC continuity.

Some examples of the apparatus may include means for communicating with the second network access device based at least in part on: a first PDCP context used while communicating with the first network access device, or a second PDCP context based at least in part on the first PDCP context. In some examples, the apparatus may include means for communicating with the second network access device based at least in part on: a first PDCP context and sequence numbering, used while communicating with the first network access device, or a second PDCP context and sequence numbering, based at least in part on the first PDCP context and sequence numbering. In some examples, the first PDCP context may include a first PDCP sequence numbering, and the second PDCP context may include a second PDCP sequence numbering based at least in part on the first PDCP sequence numbering.

Some examples of the apparatus may include means for determining to transmit the request to perform fast switching based at least in part on: an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

Some examples of the apparatus may include means for transmitting a BSR to the first network access device or the second network access device. In some examples, the apparatus may include means for transmitting a zero BSR to the first network access device before communicating with the second network access device. In some examples, the apparatus may include means for transmitting a BSR with each packet transmission to the first network access device or the second network access device.

Some examples of the apparatus may include means for transmitting a scheduling request to the second network access device before transmitting the request to perform fast switching with PDCP continuity to the second network access device; and means for transmitting, to the second network access device, a MAC layer CE or a MAC layer message indicating that the second network access device should not be in a CDRX mode during the fast switching.

In some examples of the apparatus, the request to perform fast switching may be transmitted to the second network access device in at least one of a MAC layer CE, RRC signaling, or a combination thereof. Some examples of the apparatus may include means for receiving, from the first network access device or the second network access device, a request to perform fast switching with PDCP continuity In one example, another apparatus for wireless communication at a UE is described. The apparatus may include a processor and memory in electronic communication with the processor. The processor and the memory may be configured to transmit, to a second network access device, a request to perform fast switching from the first network access device to the second network access device; receive, from the second network access device, a dual connectivity configuration for communicating with the second network access device; and communicate with the second network access device based at least in part on the dual connectivity configuration.

In some examples of the apparatus, communicating with the first network access device may include communicating using a first RAT, and communicating with the second network access device may include communicating using a second RAT (e.g., a different RAT). In some examples of the method, the fast switching includes PDCP continuity or RLC continuity.

In some examples of the apparatus, the processor and memory may be configured to communicate with the second network access device based at least in part on: a first PDCP context used while communicating with the first network access device, or a second PDCP context based at least in part on the first PDCP context. In some examples of the apparatus, the processor and memory may be configured to communicate with the second network access device based at least in part on: a first PDCP context and sequence numbering, used while communicating with the first network access device, or a second PDCP context and sequence numbering, based at least in part on the first PDCP context and sequence numbering. In some examples, the first PDCP context may include a first PDCP sequence numbering, and the second PDCP context may include a second PDCP sequence numbering based at least in part on the first PDCP sequence numbering.

In some examples of the apparatus, the processor and memory may be configured to determine to transmit the request to perform fast switching based at least in part on: an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In some examples of the apparatus, the processor and memory may be configured to transmit a BSR to the first network access device or the second network access device. In some examples of the apparatus, the processor and memory may be configured to transmit a zero BSR to the first network access device before communicating with the second network access device. In some examples, the processor and memory may be configured to transmit a BSR with each packet transmission to the first network access device or the second network access device.

In some examples of the apparatus, the processor and memory may be configured to transmit a scheduling request to the second network access device before transmitting the request to perform fast switching with PDCP continuity to the second network access device; and transmit, to the second network access device, a MAC layer CE or a MAC layer message indicating that the second network access device should not be in a CDRX mode during the fast switching.

In some examples of the apparatus, the request to perform fast switching may be transmitted to the second network access device in at least one of a MAC layer CE, RRC signaling, or a combination thereof. In some examples of the apparatus, the processor and memory may be configured to receive, from the first network access device or the second network access device, a request to perform fast switching with PDCP continuity.

In one example, another non-transitory computer-readable medium storing computer-executable code at a UE is described. The code may be executable to communicate with a first network access device; transmit, to a second network access device, a request to perform fast switching from the first network access device to the second network access device; receive, from the second network access device, a dual connectivity configuration for communicating with the second network access device; and communicate with the second network access device based at least in part on the dual connectivity configuration.

In some examples of the non-transitory computer-readable medium, the code to communicate with the first network access device may be executable to communicate using a first RAT, and communicate with the second network access device may include communicating using a second RAT (e.g., a different RAT). In some examples of the non-transitory computer-readable medium, the fast switching includes PDCP continuity or RLC continuity.

In some examples of the non-transitory computer-readable medium, the code may be executable to communicate with the second network access device based at least in part on: a first PDCP context used while communicating with the first network access device, or a second PDCP context based at least in part on the first PDCP context. In some examples, the code may be executable to communicate with the second network access device based at least in part on: a first PDCP context and sequence numbering, used while communicating with the first network access device, or a second PDCP context and sequence numbering, based at least in part on the first PDCP context and sequence numbering. In some examples, the first PDCP context may include a first PDCP sequence numbering, and the second PDCP context may include a second PDCP sequence numbering based at least in part on the first PDCP sequence numbering.

In some examples of the non-transitory computer-readable medium, the code may be executable to determine to transmit the request to perform fast switching based at least in part on: an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In some examples of the non-transitory computer-readable medium, the code may be executable to transmit a BSR to the first network access device or the second network access device. In some examples, the code may be executable to transmit a zero BSR to the first network access device before communicating with the second network access device. In some examples, the code may be executable to transmit a BSR with each packet transmission to the first network access device or the second network access device.

In some examples of the non-transitory computer-readable medium, the code may be executable to transmit a scheduling request to the second network access device before transmitting the request to perform fast switching with PDCP continuity to the second network access device; and transmit, to the second network access device, a MAC layer CE or a MAC layer message indicating that the second network access device should not be in a CDRX mode during the fast switching.

In some examples of the non-transitory computer-readable medium, the request to perform fast switching may be transmitted to the second network access device in at least one of a MAC layer CE, RRC signaling, or a combination thereof. In some examples of the non-transitory computer-readable medium, the code may be executable to receive, from the first network access device or the second network access device, a request to perform fast switching with PDCP continuity.

In one example, another method of wireless communication at a first network access device is described. The method may include communicating with a UE using a first RAT; and transmitting, to a second network access device, a first PDCP context used while communicating with the UE using the first RAT, or a second PDCP context based at least in part on the first PDCP context, the second network access device using a second RAT.

In some examples, the method may include receiving, from the second network access device, a request for a PDCP context of the UE, and the first PDCP context or the second PDCP context may be transmitted in response to the request for the PDCP context of the UE. In some examples, the first PDCP context may include a first PDCP sequence numbering, and the second PDCP context may include a second PDCP sequence numbering based at least in part on the first PDCP sequence numbering. In some examples, the method may include transmitting, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof. In some examples, the method may include receiving from the UE, at the first network access device, a duplicate of a BSR transmitted form the UE to the second network access device. In some examples, the method may include receiving a zero BSR from the UE before the UE switches to communicating with the second network access device. In some examples, the method may include receiving, from the UE, a BSR with each packet transmission to the first network access device.

In one example, another apparatus for wireless communication at a first network access device is described. The apparatus may include means for communicating with a UE using a first RAT; and means for transmitting, to a second network access device, a first PDCP context used while communicating with the UE using the first RAT, or a second PDCP context based at least in part on the first PDCP context, the second network access device using a second RAT.

In some examples, the apparatus may include means for receiving, from the second network access device, a request for a PDCP context of the UE, and the first PDCP context or the second PDCP context may be transmitted in response to the request for the PDCP context of the UE. In some examples, the first PDCP context may include a first PDCP sequence numbering, and the second PDCP context may include a second PDCP sequence numbering based at least in part on the first PDCP sequence numbering. In some examples, the apparatus may include means for transmitting, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof. In some examples, the apparatus may include means for receiving from the UE, at the first network access device, a duplicate of a BSR transmitted form the UE to the second network access device. In some examples, the apparatus may include means for receiving a zero BSR from the UE before the UE switches to communicating with the second network access device. In some examples, the apparatus may include means for receiving, from the UE, a BSR with each packet transmission to the first network access device.

In one example, another apparatus for wireless communication at a first network access device is described. The apparatus may include a processor, memory in electronic communication with the processor, and instructions stored in the memory. The processor and the memory may be configured by the instructions to communicate with a UE using a first RAT; and to transmit, to a second network access device, a first PDCP context used while communicating with the UE using the first RAT, or a second PDCP context based at least in part on the first PDCP context, the second network access device using a second RAT.

In some examples of the apparatus, the processor and the memory may be configured by the instructions to receive, from the second network access device, a request for a PDCP context of the UE, and the first PDCP context or the second PDCP context may be transmitted in response to the request for the PDCP context of the UE. In some examples, the first PDCP context may include a first PDCP sequence numbering, and the second PDCP context may include a second PDCP sequence numbering based at least in part on the first PDCP sequence numbering. In some examples, the processor and the memory may be configured by the instructions to transmit, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof. In some examples, the processor and the memory may be configured by the instructions to receive from the UE, at the first network access device, a duplicate of a BSR transmitted form the UE to the second network access device. In some examples, the processor and the memory may be configured by the instructions to receive a zero BSR from the UE before the UE switches to communicating with the second network access device. In some examples, the processor and the memory may be configured by the instructions to receive, from the UE, a BSR with each packet transmission to the first network access device.

In one example, another non-transitory computer-readable medium storing computer-executable code at a UE is described. The code may be executable to communicate with a UE using a first RAT; and to transmit, to a second network access device, a first PDCP context used while communicating with the UE using the first RAT, or a second PDCP context based at least in part on the first PDCP context, the second network access device using a second RAT.

In some examples of the computer-readable medium, the code may be executable to receive, from the second network access device, a request for a PDCP context of the UE, and the first PDCP context or the second PDCP context may be transmitted in response to the request for the PDCP context of the UE. In some examples, the first PDCP context may include a first PDCP sequence numbering, and the second PDCP context may include a second PDCP sequence numbering based at least in part on the first PDCP sequence numbering. In some examples, the code may be executable to transmit, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof. In some examples, the code may be executable to receive from the UE, at the first network access device, a duplicate of a BSR transmitted form the UE to the second network access device. In some examples, the code may be executable to receive a zero BSR from the UE before the UE switches to communicating with the second network access device. In some examples, the code may be executable to receive, from the UE, a BSR with each packet transmission to the first network access device.

In one example, a method of wireless communication at a first network access device is described. The method may include, receiving, from a UE, a request to perform fast switching from a second network access device to the first network access device; receiving, from the second network access device, a first PDCP context, or a second PDCP context based at least in part on the first PDCP context; transmitting, to the UE, a dual connectivity configuration for communicating with the first network access device; and communicating with the UE based at least in part on the dual connectivity configuration.

In some examples of the method, the communicating with the UE of the first network access device may include communicating using a first RAT, and the communicating with the UE of the second network access device may include communicating using a second RAT (e.g., a different RAT). In some examples of the method, the fast switching includes PDCP continuity or RLC continuity.

Some examples of the method may include transmitting, to the second network access device, a request for a PDCP context of the UE, and the first PDCP context or the second PDCP sequence numbering is received in response to the request for the PDCP context of the UE. In some examples, the first PDCP context may include a first PDCP sequence numbering, and the second PDCP context may include a second PDCP sequence numbering based at least in part on the first PDCP sequence numbering.

Some examples of the method may include receiving from the UE, at the first network access device, a duplicate of a BSR transmitted, from the UE, to the second network access device. Some examples of the method may include receiving a BSR with each packet transmission from the UE. In some examples, the method may include receiving a zero BSR from the UE before the UE switches to communicating with the second network access device.

Some examples of the method may include receiving a scheduling request from the UE before receiving the request to perform fast switching; and receiving, from the UE, a MAC layer CE or a MAC layer message indicating that the first network access device should not be in a CDRX mode during the fast switching.

In some examples of the method, the request to perform fast switching is received from the UE in at least one of: a MAC layer CE, a MAC layer message, RRC signaling, or a combination thereof.

In some examples, the method may include transmitting, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In one example, another apparatus for wireless communication at a first network access device is described. The apparatus may include means for receiving, from a UE, a request to perform fast switching from a second network access device to the first network access device; means for receiving, from the second network access device, a first PDCP context, or a second PDCP context based at least in part on the first PDCP context; means for transmitting, to the UE, a dual connectivity configuration for communicating with the first network access device; and means for communicating with the UE based at least in part on the dual connectivity configuration.

In some examples of the apparatus, the means for communicating with the UE of the first network access device may include communicating using a first RAT, and the communicating with the UE of the second network access device may include communicating using a second RAT (e.g., a different RAT). In some examples of the apparatus, the fast switching includes PDCP continuity or RLC continuity.

Some examples of the apparatus may include means for transmitting, to the second network access device, a request for a PDCP context of the UE, and the first PDCP context or the second PDCP sequence numbering may be received in response to the request for the PDCP context of the UE. In some examples, the first PDCP context may include a first PDCP sequence numbering, and the second PDCP context may include a second PDCP sequence numbering based at least in part on the first PDCP sequence numbering Some examples of the apparatus may include means for receiving from the UE, at the first network access device, a duplicate of a BSR transmitted, from the UE, to the second network access device. Some examples of the apparatus may include means for receiving a BSR with each packet transmission from the UE. In some examples, the apparatus may include means for receiving a zero BSR from the UE before the UE switches to communicating with the second network access device.

Some examples of the apparatus may include means for receiving a scheduling request from the UE before receiving the request to perform fast switching; and means for receiving, from the UE, a MAC layer CE or a MAC layer message indicating that the first network access device should not be in a CDRX mode during the fast switching.

In some examples of the apparatus, the request to perform fast switching is received from the UE in at least one of: a MAC layer CE, a MAC layer message, RRC signaling, or a combination thereof.

Some examples of the apparatus may include means for transmitting, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In one example, another apparatus for wireless communication at a first network access device is described. The apparatus may include a processor and memory in electronic communication with the processor. The processor and the memory may be configured to receive, from a UE, a request to perform fast switching from a second network access device to the first network access device; receive, from the second network access device, a first PDCP context, or a second PDCP context based at least in part on the first PDCP context; transmit, to the UE, a dual connectivity configuration for communicating with the first network access device; and communicate with the UE based at least in part on the dual connectivity configuration.

In some examples of the apparatus, the communicating with the UE of the first network access device may include communicating using a first RAT, and the communicating with the UE of the second network access device may include communicating using a second RAT (e.g., a different RAT). In some examples of the apparatus, the fast switching includes PDCP continuity or RLC continuity.

In some examples of the apparatus, the processor and memory may be configured to transmit, to the second network access device, a request for a PDCP context of the UE, and the first PDCP context or the second PDCP sequence numbering may be received in response to the request for the PDCP context of the UE. In some examples, the first PDCP context may include a first PDCP sequence numbering, and the second PDCP context may include a second PDCP sequence numbering based at least in part on the first PDCP sequence numbering In some examples of the apparatus, the processor and memory may be configured to receive from the UE, at the first network access device, a duplicate of a BSR transmitted, from the UE, to the second network access device. In some examples of the apparatus, the processor and memory may be configured to receive a BSR with each packet transmission from the UE. In some examples of the apparatus, the processor and memory may be configured to receive a zero BSR from the UE before the UE switches to communicating with the second network access device.

In some examples of the apparatus, the processor and memory may be configured to receive a scheduling request from the UE before receiving the request to perform fast switching; and receive, from the UE, a MAC layer CE or a MAC layer message indicating that the first network access device should not be in a CDRX mode during the fast switching.

In some examples of the apparatus, the request to perform fast switching is received from the UE in at least one of: a MAC layer CE, a MAC layer message, RRC signaling, or a combination thereof.

In some examples of the apparatus, the processor and memory may be configured to transmit, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In one example, another non-transitory computer-readable medium storing computer-executable code at a UE is described. The code may be executable to receive, from a UE, a request to perform fast switching from a second network access device to the first network access device; receive, from the second network access device, a first PDCP context, or a second PDCP context based at least in part on the first PDCP context; transmit, to the UE, a dual connectivity configuration for communicating with the first network access device; and communicate with the UE based at least in part on the dual connectivity configuration.

In some examples of the non-transitory computer-readable medium, the communicating with the UE of the first network access device may include communicating using a first RAT, and the communicating with the UE of the second network access device may include communicating using a second RAT (e.g., a different RAT). In some examples of the method, the fast switching includes PDCP continuity or RLC continuity.

In some examples of the non-transitory computer-readable medium, the code may be executable to transmit, to the second network access device, a request for a PDCP context of the UE, and the first PDCP context or the second PDCP sequence numbering may be received in response to the request for the PDCP context of the UE. In some examples, the first PDCP context may include a first PDCP sequence numbering, and the second PDCP context may include a second PDCP sequence numbering based at least in part on the first PDCP sequence numbering In some examples of the non-transitory computer-readable medium, the code may be executable to receive from the UE, at the first network access device, a duplicate of a BSR transmitted, from the UE, to the second network access device. In some examples of the non-transitory computer-readable medium, the code may be executable to receive a BSR with each packet transmission from the UE. In some examples the code may be executable to receive a zero BSR from the UE before the UE switches to communicating with the second network access device.

In some examples of the non-transitory computer-readable medium, the code may be executable to receive a scheduling request from the UE before receiving the request to perform fast switching; and receive, from the UE, a MAC layer CE or a MAC layer message indicating that the first network access device should not be in a CDRX mode during the fast switching.

In some examples of the non-transitory computer-readable medium, the request to perform fast switching is received from the UE in at least one of: a MAC layer CE, a MAC layer message, RRC signaling, or a combination thereof.

In some examples of the non-transitory computer-readable medium, the code may be executable to transmit, to the UE, a request for the UE to perform fast switching with PDCP continuity, with the request for the UE to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for managing dual connectivity in an uplink. In some examples, a UE may indicate, to a network, a capability of the UE to operate in an uplink aggregation dual connectivity mode or a fast switching dual connectivity mode, which in some examples may include PDCP continuity or RLC continuity. When operating in the uplink aggregation dual connectivity mode, the UE may communicate with first and second network access devices simultaneously, with the second of the network access devices receiving data from the first network access device and transmitting the data to the UE (on a downlink), or receiving data from the UE and transmitting the data to the first network access device. When operating in a fast switching dual connectivity mode with PDCP continuity, the UE may communicate with a first network access device and switch to communicating with a second network access device, with data being transmitted and/or received from just one of the network access devices at a time. Each of the uplink aggregation dual connectivity mode and the fast switching dual connectivity mode may include PDCP continuity or RLC continuity utilizing a split bearer. A split bearer in a fast switching dual connectivity mode may be referred to as a fast switching bearer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
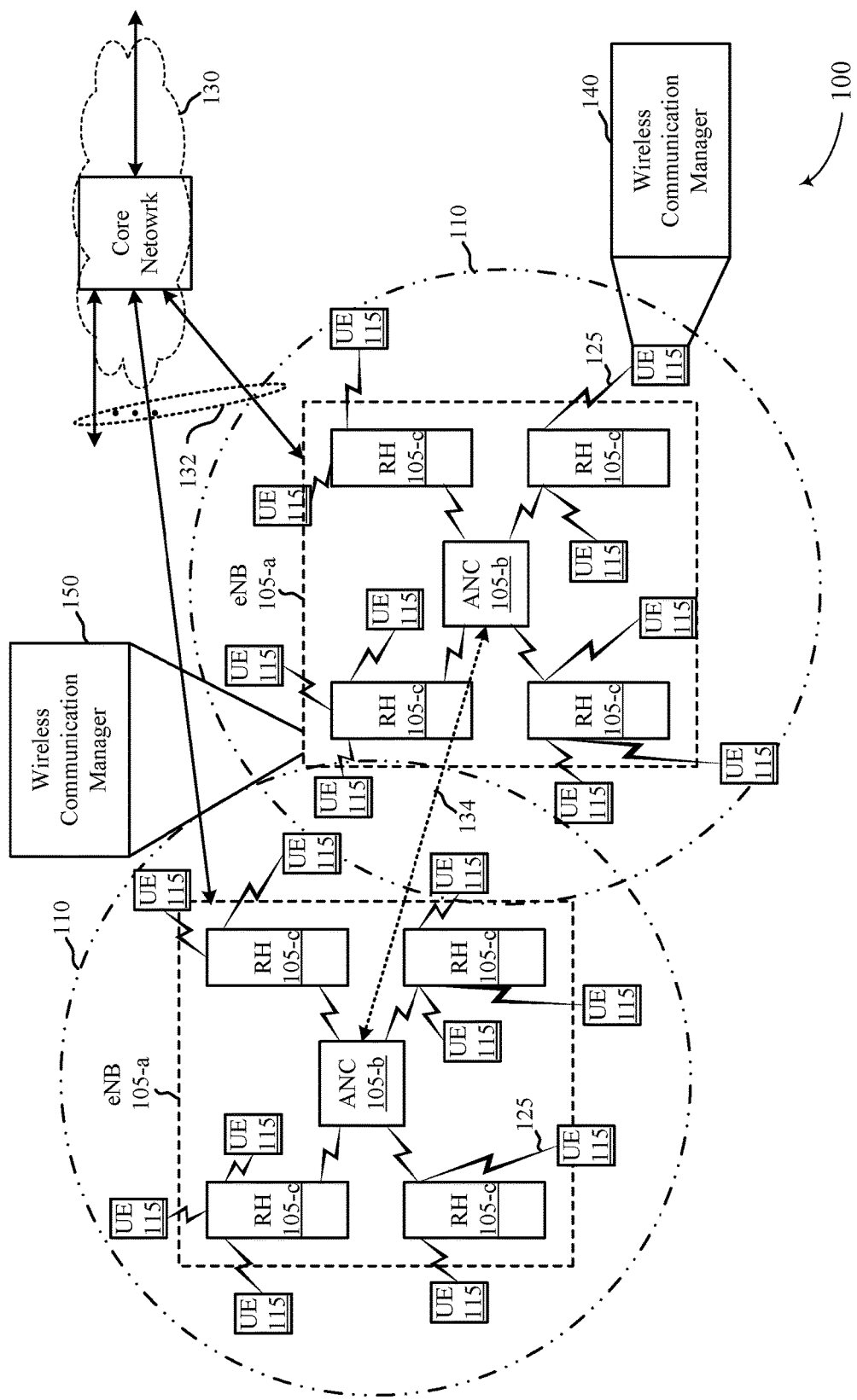
FIGS. 1-3 show examples of wireless communication systems that support techniques for managing dual connectivity in an uplink, in accordance with one or more aspects of the present disclosure.

FIG. 1 shows an example of a wireless communication system 100 that supports techniques for managing dual connectivity in an uplink, in accordance with one or more aspects of the present disclosure. The wireless communication system 100 may include network access devices 105 (e.g., gNBs 105-$a$, ANCs 105-$b$, and/or RHs 105-$c$), UEs 115, and a core network 130. The core network 130 may provide user authentication, access authorization, tracking, Internet Protocol (IP) connectivity, and other access, routing, or mobility functions. At least some of the network access devices 105 (e.g., gNBs 105-$a$ or ANCs 105-$b$) may interface with the core network 130 through backhaul links 132 (e.g., S1, S2, etc.) and may perform radio configuration and scheduling for communication with the UEs 115. In various examples, the ANCs 105-$b$ may communicate, either directly or indirectly (e.g., through core network 130), with each other over backhaul links 134 (e.g., X1, X2, etc.), which may be wired or wireless communication links. Each ANC 105-$b$ may also communicate with a number of UEs 115 through a number of smart radio heads (e.g., RHs 105-$c$). In an alternative configuration of the wireless communication system 100, the functionality of an ANC 105-$b$ may be provided by a radio head 105-$c$ or distributed across the radio heads 105-$c$ of a gNB 105-$a$. In another alternative configuration of the wireless communication system 100 (e.g., an LTE/LTE-A configuration), the radio heads 105-$c$ may be replaced with base stations, and the ANCs 105-$b$ may be replaced by base station controllers (or links to the core network 130). In some examples, the wireless communication system 100 may include a mix of radio heads 105-$c$, base stations, and/or other network access devices 105 for receiving/transmitting communications according to different RATs (e.g., LTE/LTE-A, 5G, Wi-Fi, etc.).

A macro cell may cover a relatively large geographic area 110 (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area 110 and may allow unrestricted access by UEs 115 with service subscriptions with a network provider. A femto cell also may cover a relatively small geographic area 110 (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communication system 100 may support synchronous or asynchronous operation. For synchronous operation, the gNBs 105-$a$ and/or radio heads 105-$c$ may have similar frame timing, and transmissions from different gNBs 105-$a$ and/or radio heads 105-$c$ may be approximately aligned in time. For asynchronous operation, the gNBs 105-$a$ and/or radio heads 105-$c$ may have different frame timings, and transmissions from different gNBs 105-$a$ and/or radio heads 105-$c$ may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or PDCP layer may be IP-based. A RLC layer may in some cases perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a radio head 105-$c$, ANC 105-$b$, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of gNBs 105-$a$, radio heads 105-$c$, base stations, access points, or other network access devices, including macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks from a UE 115 to a radio head 105-$c$, and/or downlinks, from a radio head 105-$c$ to a UE 115. The downlinks may also be called forward links, while the uplinks may also be called reverse links. Control information and data may be multiplexed on an uplink or downlink according to various techniques. Control information and data may be multiplexed on an uplink or downlink, for example, using time division multiplexing (TDM) techniques, frequency division multiplexing (FDM) techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and time division duplexing (TDD) (e.g., frame structure type 2) may be defined.

In some examples of the wireless communication system 100, network access devices 105 (e.g., radio heads 105-*c*) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both FDD and TDD component carriers.

In some examples, a UE 115 may include a wireless communication manager 140. In some examples, the wireless communication manager 140 may be used to transmit, to a network (e.g., to a network access device 105), an indication of a capability to operate in an uplink aggregation dual connectivity mode or in an uplink fast switching dual connectivity (e.g., including PDCP continuity or RLC continuity); and receive, from the network (e.g., from the network access device 105), a dual connectivity configuration for the UE 115 based at least in part on the indication of the capability. In some examples, the wireless communication manager 140 may be used to communicate with a first network access device 105; transmit, to a second network access device, a request to perform fast switching from the first network access device to the second network access device; receive, from the second network access device, a dual connectivity configuration for communicating with the second network access device; and communicate with the second network access device based at least in part on the dual connectivity configuration.

In some examples, a network access device 105 may include a wireless communication manager 150. In some examples, the wireless communication manager 150 may be used to receive, from a UE 115, an indication of a capability to operate in an uplink aggregation dual connectivity mode or in an uplink fast switching dual connectivity mode (e.g., including PDCP continuity or RLC continuity); determine a dual connectivity configuration for the UE 115 based at least in part on the indication of the capability; and transmit the dual connectivity configuration to the UE 115. In some examples, the wireless communication manager 150 may be used by a first network access device 105 to communicate with a UE 115 using a first RAT; and transmit, to a second network access device 105, a first PDCP context used while communicating with the UE using the first RAT, or a second PDCP context based at least in part on the first PDCP context, the second network access device 105 using a second RAT. In some examples, the wireless communication manager 150 may be used by a first network access device 105 to receive, from a UE 115, a request to perform fast switching from a second network access device 105 to the first network access device 105 (e.g., with the first network access device 105 using a first RAT, and the second network access device 105 using a second RAT, which may be different from the first RAT); receive, from the second network access device 105, a first PDCP context (e.g., used while communicating with the UE using the second RAT), or a second PDCP context based at least in part on the first PDCP context; transmit, to the UE 115, a dual connectivity configuration for communicating with the first network access device 105; and communicate with the UE 115 based at least in part on the dual connectivity configuration.

Figure 2:
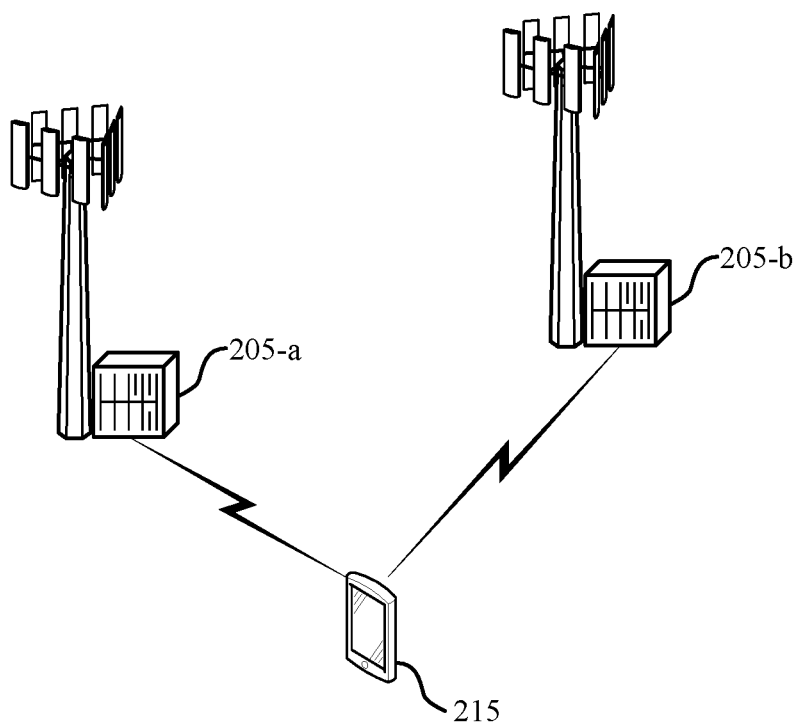

FIG. 2 shows an example of a wireless communication system 200 that supports techniques for managing dual connectivity in an uplink, in accordance with one or more aspects of the present disclosure. The wireless communication system 200 may be an example of aspects of the wireless communication system 100, and may include a first network access device 205-*a*, a second network access device 205-*b*, and a UE 215. The network access devices 205 and UE 215 may be examples of aspects of the network access devices 105 and UEs 115, respectively, described with reference to FIG. 1.

In some examples, the UE 215 may transmit, to the first network access device 205-*a*, an indication of a capability to operate in an uplink aggregation dual connectivity mode or in an uplink fast switching dual connectivity mode. In various examples the uplink aggregation dual connectivity mode or the uplink fast switching dual connectivity mode may include PDCP or RLC continuity. In some examples, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples the UE 215 may report a link preference or a link requirement (e.g., in a UE Capability Information message). The preference or requirement reported by the UE 215 may be used for a bearer selection for communication with the UE 215. For example, the UE 215 may report a link preference as being either a master cell group (MCG) or a secondary cell group (SCG). In some examples the UE 215 may report a link data ratio, which may be a ratio of data between the MCG and the SCG. For a fast switching configuration, the UE may report a preference or a requirement for a periodicity of fast switching (e.g., a duration on each link prior to a switching operation).

The first network access device 205-*a* may receive the indication of the capability of the UE 215 and determine if and how to configure the UE 215 in a dual connectivity mode. When the indication of the capability indicates support for the uplink aggregation dual connectivity mode, or a supported aggregate uplink throughput sufficient to support the uplink aggregation dual connectivity mode, the first network access device 205-*a* may configure the UE 215 in the uplink aggregation dual connectivity mode and transmit a dual connectivity configuration to the UE 215.

In some examples, the first network access device 205-*a* may transmit, to the UE 215, a dual connectivity configuration based at least in part on the uplink aggregation dual connectivity mode. The dual connectivity configuration may include a configuration of a split bearer. A split bearer may be referred to as a fast switching bearer, and may support aggregation dual connectivity and/or fast switching. The split bearer may be associated with the first network access device 205-a using a first RAT (e.g., a NR, 5G, or mmW RAT), and with the second network access device 205-b using a second RAT (e.g., an LTE/LTE-A RAT). Alternatively, the RAT associations may be reversed, or may differ.

After receiving and implementing the dual connectivity configuration received from the first network access device 205-a, the UE 215 may simultaneously transmit data to the first network access device 205-a and the second network access device 205-b. In some examples, the second network access device 205-b may forward data received from the UE 215 to the first network access device 205-a (e.g., over a backhaul link between the first network access device 205-a and the second network access device 205-b.

In some examples, the UE 215 may transmit a BSR to the first network access device 205-a or the second network access device 205-b. In some examples, the UE 215 may determine (e.g., arbitrate) a first amount of data to be transmitted to the first network access device 205-a and a second amount of data to be transmitted to the second network access device 205-b, transmit a first BSR over the split bearer to the first network access device 205-a based at least in part on the first amount of data, and transmit a second BSR over the split bearer to the second network access device 205-b based at least in part on the second amount of data.

In some examples, the UE 215 may transmit a single BSR over the split bearer to both the first network access device 205-a and the second network access device 205-b. In these examples, the first network access device 205-a may use channel state information (CSI) feedback (e.g., from the UE 215) or realtime channel conditions to arbitrate uplink grants provided to the UE 215 for transmitting to the first network access device 205-a or the second network access device 205-b. After receiving the uplink grants, the UE 215 may also arbitrate which parts of its traffic will be transmitted to the first network access device 205-a or the second network access device 205-b.

In some examples, a BSR may be transmitted with each packet transmission. In some examples, the BSR transmitted with a packet may contain a buffer status after all uplink grants have been used. In some examples, the BSR transmitted with a packet may contain frame number information (e.g., a hyper frame number (HFN)) indicating when a BSR value included in the BSR was determined (i.e., the BSR may be correlated with a transmission time interval (TTI) for which a BSR value was computed).

In some examples, a BSR may be transmitted to the first network access device 205-a or the second network access device 205-b based on a request from the first network access device 205-a or the second network access device 205-b. In some examples, a BSR may be transmitted proactively by the UE 215.

Figure 3:
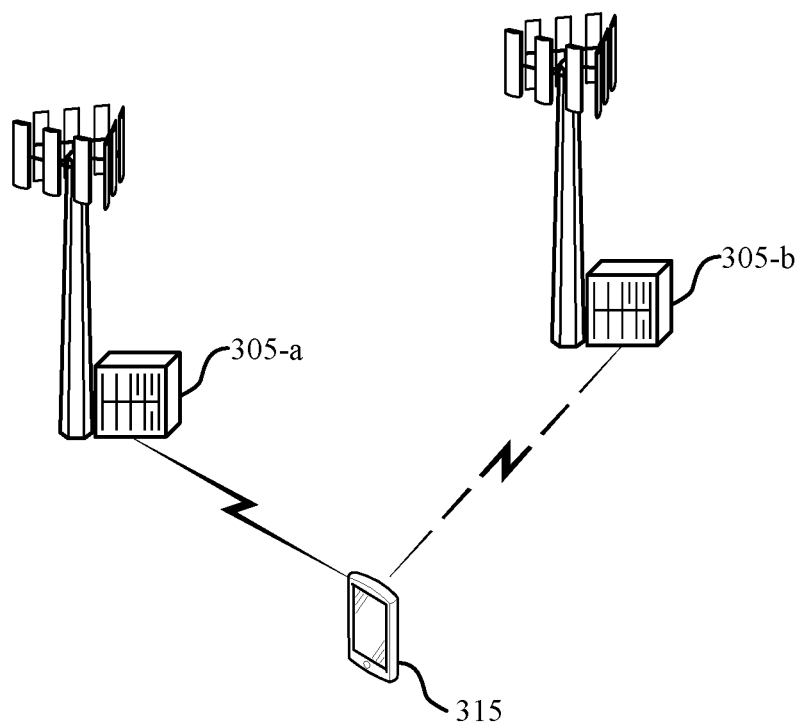

FIG. 3 shows an example of a wireless communication system 300 that supports techniques for managing dual connectivity in an uplink, in accordance with one or more aspects of the present disclosure. The wireless communication system 300 may be an example of aspects of the wireless communication system 100, and may include a first network access device 305-a, a second network access device 305-b, and a UE 315. The network access devices 305 and UE 315 may be examples of aspects of the network access devices 105 and UEs 115, respectively, described with reference to FIGS. 1 and 2.

In some examples, the UE 315 may transmit, to the first network access device 305-a, an indication of a capability to operate in an uplink aggregation dual connectivity mode or in an uplink fast switching dual connectivity mode. In various examples, the uplink aggregation dual connectivity mode or the fast switching dual connectivity mode may include PDCP continuity or RLC continuity. In some examples, the indication of the capability may include at least one of a first indication of a supported aggregate uplink throughput, a second indication of whether an additional uplink mode is supported, a third indication of whether the uplink aggregation dual connectivity mode is supported, or a combination thereof.

In some examples the UE 215 may report a link preference or a link requirement (e.g., in a UE Capability Information message). The preference or requirement reported by the UE 215 may be used for a bearer selection for communication with the UE 215. For example, the UE 215 may report a link preference as being either a master cell group (MCG) or a secondary cell group (SCG). In some examples the UE 215 may report a link data ratio, which may be a ratio of data between the MCG and the SCG. For a fast switching configuration, the UE may report a preference or a requirement for a periodicity of fast switching (e.g., a duration on each link prior to a switching operation).

The first network access device 305-a may receive the indication of the capability of the UE and determine if and how to configure the UE 315 in a dual connectivity mode. When the indication of the capability indicates support for the uplink fast switching dual connectivity mode (e.g., with PDCP continuity or RLC continuity), support for communication on only one RAT, lack of support for the uplink aggregation dual connectivity mode, or a supported aggregate uplink throughput that is not sufficient to support the uplink aggregation dual connectivity mode, the first network access device 305-a may configure the UE 315 in the fast switching dual connectivity mode (e.g., with PDCP continuity or RLC continuity) and transmit a dual connectivity configuration to the UE 315. The first network access device 305-a may also configure the UE 315 in the fast switching dual connectivity mode (e.g., with PDCP continuity or RLC continuity), despite the UE 315 supporting the uplink aggregation dual connectivity mode or having sufficient aggregate uplink throughput, for reasons determined by the first network access device 305-a.

In some examples, the first network access device 305-a may transmit, to the UE 315, a dual connectivity configuration based at least in part on the fast switching dual connectivity mode (e.g., with PDCP continuity or RLC continuity). The dual connectivity configuration may include a configuration of a split bearer, which may be referred to as a fast switching bearer. The split bearer may be associated with at least the first network access device 305-a using a first RAT (e.g., a NR, 5G or mmW RAT), and with another network access device using a second RAT (e.g., an LTE/LTE-A RAT). Alternatively, the RAT associations may be reversed, or may differ.

Once enabled, fast switching with PDCP continuity may be performed from the first network access device 305-a to the second network access device 305-b. In some examples, the UE 315 may determine to switch from communicating with the first network access device 305-a to communicating with the second network access device 305-b. The determination may be based, for example, on an uplink throughput estimation, a downlink throughput estimation, a RSRQ measurement, a RSRP measurement, a number of HARQ repetitions, a RLC PER, a PDCP PER, an application type, an application metric, historic information on the first network access device 305-*a* or the second network access device 305-*b* (e.g., behaviors of the first network access device 305-*a* or the second network access device 305-*b*), or a combination thereof (with the above parameters being determined and/or received by the UE 315). Based on a determination to perform fast switching with PDCP continuity, the UE 315 may transmit, to the second network access device 305-*b*, a request to perform fast switching with PDCP continuity.

In some examples, the first network access device 305-*a* or second network access device 305-*b* may determine that the UE 315 should perform fast switching (e.g., with PDCP continuity or RLC continuity) and may transmit to the UE 315 a request for the UE 315 to perform fast switching with PDCP continuity or RLC continuity. In various examples the request may be transmitted by the first network access device 305-*a* or the second network access device 305-*b* in at least one of a MAC layer CE, a MAC layer message, RRC signaling, or a combination thereof. In some examples, the request that the UE 315 perform fast switching may be based on an uplink throughput estimation, a downlink throughput estimation, a RSRQ measurement, a RSRP measurement, a number of HARQ repetitions, a RLC PER, a PDCP PER, an application type, an application metric, historic information on the first network access device 305-*a* or the second network access device 305-*b*, or a combination thereof (with the above parameters being determined and/or received by the first network access device 305-*a* or the second network access device 305-*b*).

Regardless of whether fast switching is triggered by the UE 315, the first network access device 305-*a*, or the second network access device 305-*b*, the UE 315, upon being triggered to perform fast switching, may transmit to the second network access device 305-*b* a request to perform fast switching. In some examples, the request may be transmitted in a MAC layer CE, a MAC layer message, RRC signaling, or a combination thereof. After receiving a request to perform fast switching with PDCP continuity, the second network access device 305-*b* may optionally transmit to the first network access device 305-*a* (e.g., over a backhaul link) a request to transfer a PDCP context of the UE 315, and the first network access device 305-*a* may transfer the PDCP context of the UE 315 to the second network access device 305-*b*. Alternatively, when the first network access device 305-*a* triggers the performance of fast switching with PDCP continuity by the UE 315, the first network access device 305-*a* may optionally and proactively transfer the PDCP context of the UE 315 to the second network access device 305-*b*. Alternatively, when the second network access device 305-*b* triggers the performance of fast switching with PDCP continuity by the UE 315, the second network access device 305-*b* may optionally and proactively request a transfer of the PDCP context of the UE 315 to the second network access device 305-*b*.

In some examples, the PDCP or RLC context used for communications between the UE 315 and the first network access device 305-*a* may be transferred to the second network access device 305-*b* (i.e., the PDCP or RLC context may be retained). For example, the first network access device 305-*a* may transfer, to the second network access device 305-*b*, the PDCP context (and PDCP sequence numbering) used to communicate with the UE 315. In some examples, the PDCP context or RLC context used for communications between the UE 315 and the first network access device 305-*a* may be transitioned to the second network access device 305-*b*. For example, the first network access device 305-*a* may transfer, to the second network access device 305-*b*, a PDCP context (and PDCP sequence numbering) that is based on a different PDCP context (and PDCP sequence numbering) used for communication between the UE 315 and the first network access device 305-*a*. When the PDCP context or the RLC context of the UE 315 is transitioned, it is assumed that the security context to support the transitioned PDCP context or RLC context is already established by the second network access device 305-*b*.

When the UE 315 performs fast switching from the first network access device 305-*a* using a NR, 5G, or mmW RAT to the second network access device 305-*b* using a LTE/LTE-A RAT, a retained or transitioned PDCP context or RLC context may be transferred from the first network access device 305-*a* to the second network access device 305-*b*. When the UE 315 performs fast switching from the first network access device 305-*a* using a LTE/LTE-A RAT to the second network access device 305-*b* using a NR, 5G, or mmW RAT, the network may account for entry of the UE 315 into the NR, 5G, or mmW coverage area of the second network access device 305-*b* by transitioning PDCP context or RLC context of the UE 315 in advance.

After requesting to perform fast switching, the UE 315 may receive, from the second network access device 305-*b*, a dual connectivity configuration for communicating with the second network access device 305-*b* and may communicate with the second network access device 305-*b* based on the dual connectivity configuration.

In some examples, the UE 315 may transmit a BSR to the first network access device 305-*a* or the second network access device 305-*b*. In some examples, the UE 315 may transmit a BSR for just one RAT at a time. For example, the UE 315 may determine (or select) the RAT of operation, transmit a BSR to a network access device that uses the RAT of operation, and receive uplink grants for the RAT of operation. When the UE 315 switches from one RAT of operation to another RAT of operation, the network may implicitly assume that the UE 315 is abandoning the first RAT of operation, and that any BSR reported for the first RAT of operation do not need to be serviced. Alternatively, the UE 315 may transmit a zero BSR to the network access device 305 that uses the first RAT of operation, before communicating with the network access device 305 that uses a second RAT of operation.

In some examples, a BSR may be transmitted with each packet transmission. In some examples, the BSR transmitted with a packet may contain a buffer status after all uplink grants have been used. In some examples, the BSR transmitted with a packet may contain frame number information (e.g., a HFN) indicating when a BSR value included in the BSR was determined (i.e., the BSR may be correlated with a TTI for which a BSR value was computed).

In some examples, a BSR may be transmitted to the first network access device 305-*a* or the second network access device 305-*b* based on a request from the first network access device 305-*a* or the second network access device 305-*b*. In some examples, a BSR may be transmitted proactively by the UE 315.

In these examples, a network access device may use CSI feedback (e.g., from the UE 315) or realtime channel conditions to arbitrate uplink grants provided to the UE 315 for transmitting to the network access device 305. After receiving the uplink grants, the UE 315 may also arbitrate which parts of its traffic will be transmitted to the network access device 305.

In some examples, using only a grant to dynamically select a link may leave relatively few resources for the UE 315 to prepare a data transfer on its memory based on the link selection status. Thus a notification of a link switch may be used by the UE 315, by the first access device 305-*a*, the second network access device 305-*b*, or a combination thereof. In various examples, the link switch notification may be provided by a MAC CE, a PDCP control PDU, or RRC signaling. For example, after a timer expiration or a specific packet transmission, the UE 315, the first network access device 305-*a*, or the second network access device 305-*b* could send a MAC CE, or PDCP control PDU, or RRC signalling to notify the link switch in the following data transfer, which may enable the UE 315, the first network access device 305-*a*, or the second network access device 305-*b* to make preparation for a following data transfer.

In some examples, the UE 315 may sense that it may need to perform fast switching, and the UE 315 may signal its intention (or likelihood) to perform fast switching to the second network access device 305-*b*. When the second network access device 305-*b* uses a LTE/LTE-A RAT, the second network access device 305-*b* can enter a long CDRX state with 320 ms cycles. Even with VoLTE operation, the second network access device 305-*b* can enter a CDRX state with 20 ms, 40 ms, or 60/64 ms cycles. When the second network access device 305-*b* is in an OFF portion of a long CDRX cycle, the second network access device 305-*b* may be unable to perform fast switching. The UE 315 may therefore signal to the second network access device 305-*b* that the second network access device 305-*b* should not be in a CDRX mode (or at least not during a time when the UE 315 may be ready to perform the fast switching). In some examples, the UE 315 may transmit a SR to the second network access device 305-*b* before transmitting a request to perform fast switching to the second network access device 305-*b*. The UE 315 may also transmit, to the second network access device 305-*b*, a MAC layer CE indicating that the second network access device 305-*b* should not be in a CDRX mode during the fast switching intended by the UE 315. In some examples, the UE 315 may have to determine CSI and report to the second network access device 305-*b* that disrupting its CDRX cycle will avoid a delay in its switching process.

When employing fast switching and enabling CA, enough carriers should be configured/activated to maintain a required throughput. In some examples, the number of configured/activated carriers may include all or a part of the maximum number of carriers that may be configured/activated (as needed).

Figure 4:
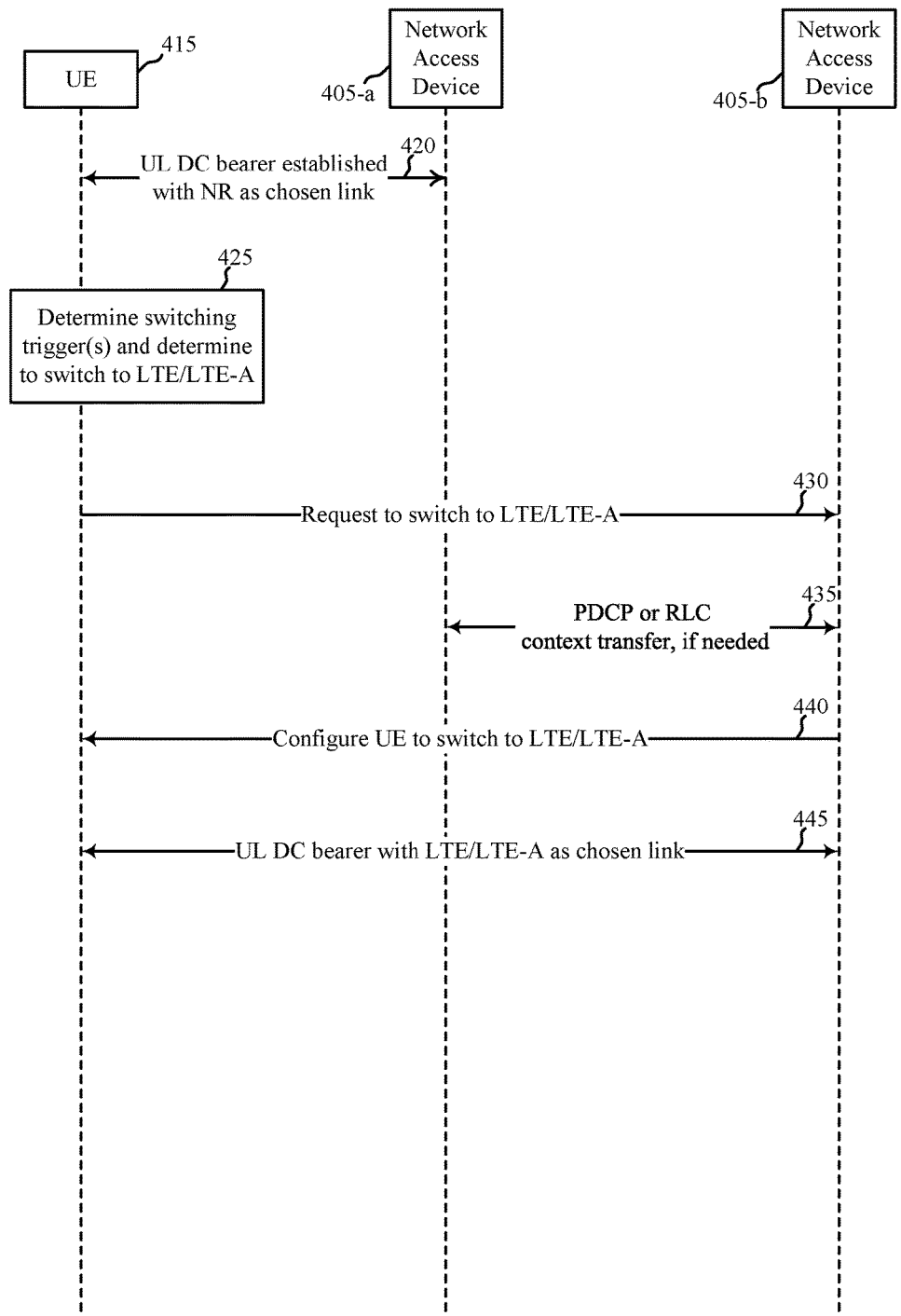
FIG. 4 shows an example message flow between a UE, a first network access device, and a second network access device during a fast switching operation, in accordance with one or more aspects of the present disclosure.

FIG. 4 shows an example message flow 400 between a UE 415, a first network access device 405-*a*, and a second network access device 405-*b* during a fast switching operation, in accordance with one or more aspects of the present disclosure. The network access devices 405 and UE 415 may be examples of aspects of the network access devices 105 and UEs 115, respectively, described with reference to FIGS. 1, 2, and 3.

At 420, the UE 415 may communicate with the first network access device 405-*a* using a first RAT (e.g., a NR RAT) and a first split (dual connectivity) bearer (e.g., with the first RAT selected as the chosen link).

At 425, the UE 415 may determine, based on one or more triggers, to switch to communicating with the second network access device 405-*b* using a second RAT (e.g., a LTE/LTE-A RAT).

At 430, the UE 415 may transmit, to the second network access device 405-*b*, a request to perform fast switching (e.g., with PDCP continuity or RLC continuity), from the first network access device 405-*a* to the second network access device 405-*b*.

At 435, the first network access device 405-*a* may optionally transmit a PDCP or RLC context used while communicating with the UE 415 using the first RAT, or a second PDCP context or RLC context based at least in part on the first PDCP context or RLC context, to the second network access device 405-*b*.

At 440, the second network access device 405-*b* may transmit, to the UE 415, a dual connectivity configuration for communicating with the second network access device 405-*b*, with the second RAT (e.g., a LTE/LTE-A RAT) selected as the chosen link.

At 445, the UE 415 may communicate with the second network access device 405-*b* using the second RAT (e.g., the LTE/LTE-A RAT) and a first split (dual connectivity) bearer (e.g., with the second RAT selected as the chosen link).

Figure 5:
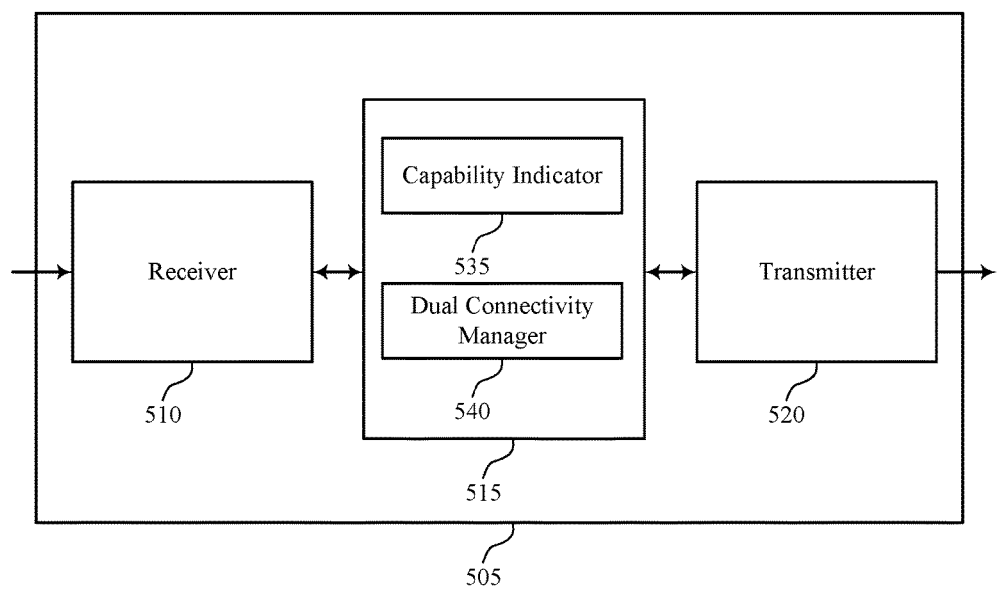
FIGS. 5-9 show block diagrams of apparatuses that support techniques for managing dual connectivity in an uplink for use in wireless communication, in accordance with various aspects of the present disclosure.

FIG. 5 shows a block diagram 500 of an apparatus 505 that support techniques for managing dual connectivity in an uplink, in accordance with one or more aspects of the present disclosure. The apparatus 505 may be an example of aspects of a UE described with reference to FIGS. 1-4. The apparatus 505 may include a receiver 510, a wireless communication manager 515, and a transmitter 520. The apparatus 505 may also include a processor. Each of these components may be in communication with one another (e.g., via one or more buses).

The receiver 510 may receive data or control signals or information (i.e., transmissions), some or all of which may be associated with various information channels (e.g., data channels, control channels, etc.). Received signals or information, or measurements performed thereon, may be passed to other components of the apparatus 505. The receiver 510 may include a single antenna or a set of antennas.

The wireless communication manager 515 and/or at least some of its various sub-components may be implemented in hardware, software executed by a processor, firmware, or any combination thereof. If implemented in software executed by a processor, the functions of the wireless communication manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The wireless communication manager 515 and/or at least some of its various sub-components may be physically located at various positions, including being distributed such that portions of functions are implemented at different physical locations by one or more physical devices. In some examples, the wireless communication manager 515 and/or at least some of its various sub-components may be a separate and distinct component in accordance with one or more aspects of the present disclosure. In other examples, the wireless communication manager 515 and/or at least some of its various sub-components may be combined with one or more other hardware components, including but not limited to an I/O component, a transceiver, another computing device, one or more other components described in the present disclosure, or a combination thereof, in accordance with one or more aspects of the present disclosure. The wireless communication manager 515 may be an example of aspects of the wireless communication manager described with reference to FIG. 1. The wireless communication manager 515 may include a capability indicator 535 and a dual connectivity manager 540.

The capability indicator 535 may be used to transmit, to a network, an indication of a capability to operate in an uplink aggregation dual connectivity mode or in an uplink fast switching dual connectivity mode (e.g., with PDCP continuity or RLC continuity), as described for example with reference to FIG. 2 or 3. In some examples, the indication of the capability may include at least one of a first indication of a supported aggregate uplink throughput, a second indication of whether an additional uplink mode is supported, a third indication of whether the uplink aggregation dual connectivity mode is supported, or a combination thereof.

The dual connectivity manager 540 may be used to receive, from the network, a dual connectivity configuration for a UE (e.g., a UE including the apparatus 505) based at least in part on the indication of the capability, as described for example with reference to FIG. 2 or 3. In some examples, the received dual connectivity configuration may be based at least in part on the uplink aggregation dual connectivity mode and includes a configuration of a split bearer. The split bearer may be associated with a first network access device using a first RAT and a second network access device using a second RAT (e.g., different from the first RAT).

In some examples, the wireless communication manager 515 may be used to determine a first amount of data to be transmitted to the first network access device and a second amount of data to be transmitted to the second network access device; transmit a first BSR of the UE over the split bearer, to the first network access device, based at least in part on the first amount of data; and transmit a second BSR of the UE over the split bearer, to the second network access device, based at least in part on the second amount of data.

In some examples, the wireless communication manager 515 may be used to transmit a single BSR over the split bearer to the first network access device and the second network access device.

The transmitter 520 may transmit data or control signals or information (i.e., transmissions) generated by other components of the apparatus 505, some or all of which may be associated with various information channels (e.g., data channels, control channels, etc.). In some examples, the transmitter 520 may be collocated with the receiver 510 in a transceiver. For example, the transmitter 520 and receiver 510 may be an example of aspects of the transceiver 1030 described with reference to FIG. 10. The transmitter 520 may include a single antenna or a set of antennas.

Figure 6:
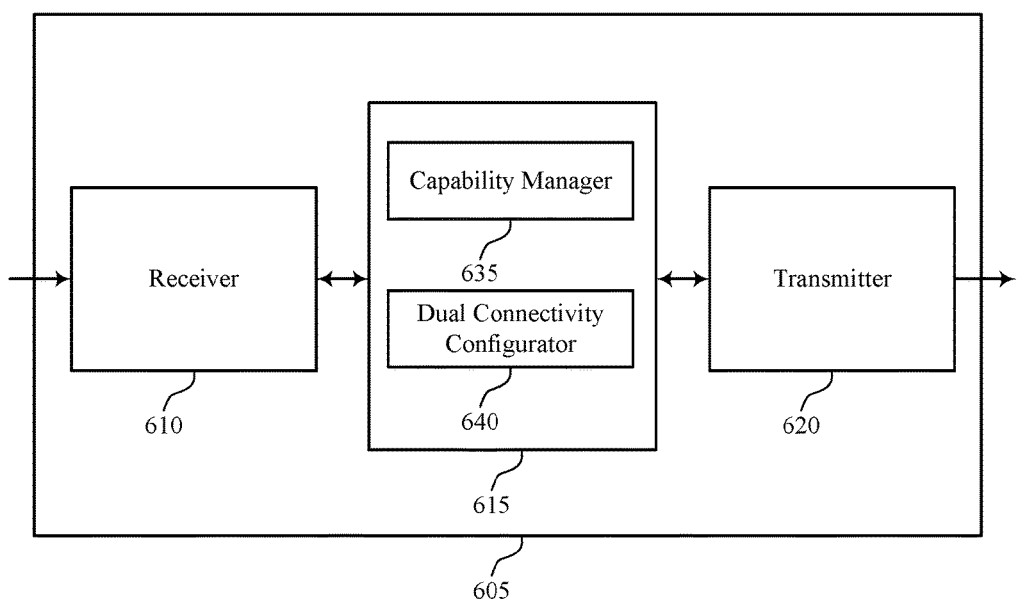

FIG. 6 shows a block diagram 600 of an apparatus 605 that support techniques for managing dual connectivity in an uplink, in accordance with one or more aspects of the present disclosure. The apparatus 605 may be an example of aspects of a network access device described with reference to FIGS. 1-4. The apparatus 605 may include a receiver 610, a wireless communication manager 615, and a transmitter 620. The apparatus 605 may also include a processor. Each of these components may be in communication with one another (e.g., via one or more buses).

The receiver 610 may receive data or control signals or information (i.e., transmissions), some or all of which may be associated with various information channels (e.g., data channels, control channels, etc.). Received signals or information, or measurements performed thereon, may be passed to other components of the apparatus 605. The receiver 610 may include a single antenna or a set of antennas.

The wireless communication manager 615 and/or at least some of its various sub-components may be implemented in hardware, software executed by a processor, firmware, or any combination thereof. If implemented in software executed by a processor, the functions of the wireless communication manager 615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless communication manager 615 and/or at least some of its various sub-components may be physically located at various positions, including being distributed such that portions of functions are implemented at different physical locations by one or more physical devices. In some examples, the wireless communication manager 615 and/or at least some of its various sub-components may be a separate and distinct component in accordance with one or more aspects of the present disclosure. In other examples, the wireless communication manager 615 and/or at least some of its various sub-components may be combined with one or more other hardware components, including but not limited to an I/O component, a transceiver, another computing device, one or more other components described in the present disclosure, or a combination thereof, in accordance with one or more aspects of the present disclosure. The wireless communication manager 615 may be an example of aspects of the wireless communication manager described with reference to FIG. 1. The wireless communication manager 615 may include a capability manager 635 and a dual connectivity configurator 640.

The capability manager 635 may be used to receive, from a UE, an indication of a capability to operate in an uplink aggregation dual connectivity mode or in an uplink fast switching dual connectivity mode (e.g., with PDCP continuity or RLC continuity), as described for example with reference to FIG. 2 or 3. In some examples, the indication of the capability may include at least one of a first indication of a supported aggregate uplink throughput, a second indication of whether an additional uplink mode is supported, a third indication of whether the uplink aggregation dual connectivity mode is supported, or a combination thereof.

The dual connectivity configurator 640 may be used to determine a dual connectivity configuration for the UE based at least in part on the indication of the capability, as described for example with reference to FIG. 2 or 3. The dual connectivity configurator 640 may also be used to transmit the dual connectivity configuration to the UE, as described for example with reference to FIG. 2 or 3. In some examples, the determined dual connectivity configuration may be based at least in part on the uplink aggregation dual connectivity mode and may include a configuration of a split bearer. The split bearer may be associated with a first network access device using a first RAT (e.g., a network access device including the apparatus 605) and a second network access device using a second RAT.

In some examples, the wireless communication manager 615 may be used to receive a first BSR of the UE, over the split bearer, at the first network access device and to receive a second BSR of the UE from the second network access device. The first BSR of the UE may indicate a first amount of data to be transmitted to the first network access device, and the second BSR of the UE may indicate a second amount of data to be transmitted to the second network access device.

In some examples, the wireless communication manager 615 may be used to receive a BSR of the UE, over the split bearer, at the first network access device and to receive a duplicate of the BSR of the UE from the second network access device.

The transmitter 620 may transmit data or control signals or information (i.e., transmissions) generated by other components of the apparatus 605, some or all of which may be associated with various information channels (e.g., data channels, control channels, etc.). In some examples, the transmitter 620 may be collocated with the receiver 610 in a transceiver. For example, the transmitter 620 and receiver 610 may be an example of aspects of the transceiver 1150 described with reference to FIG. 11. The transmitter 620 may include a single antenna or a set of antennas.

Figure 7:
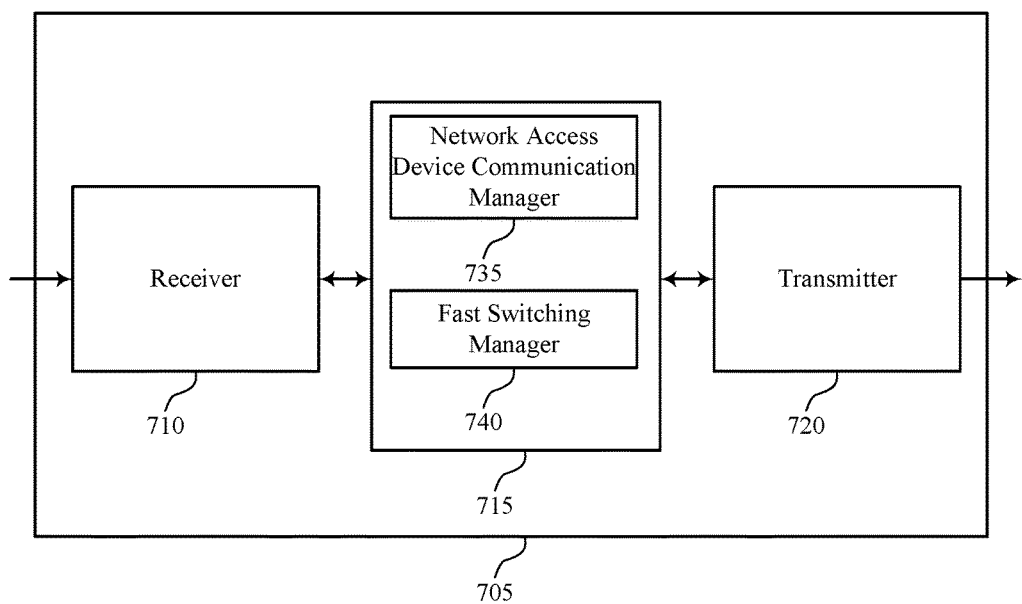

FIG. 7 shows a block diagram 700 of an apparatus 705 that support techniques for managing dual connectivity in an uplink, in accordance with one or more aspects of the present disclosure. The apparatus 705 may be an example of aspects of a UE described with reference to FIGS. 1-4. The apparatus 705 may include a receiver 710, a wireless communication manager 715, and a transmitter 720. The apparatus 705 may also include a processor. Each of these components may be in communication with one another (e.g., via one or more buses).

The receiver 710 may receive data or control signals or information (i.e., transmissions), some or all of which may be associated with various information channels (e.g., data channels, control channels, etc.). Received signals or information, or measurements performed thereon, may be passed to other components of the apparatus 705. The receiver 710 may include a single antenna or a set of antennas.

The wireless communication manager 715 and/or at least some of its various sub-components may be implemented in hardware, software executed by a processor, firmware, or any combination thereof. If implemented in software executed by a processor, the functions of the wireless communication manager 715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless communication manager 715 and/or at least some of its various sub-components may be physically located at various positions, including being distributed such that portions of functions are implemented at different physical locations by one or more physical devices. In some examples, the wireless communication manager 715 and/or at least some of its various sub-components may be a separate and distinct component in accordance with one or more aspects of the present disclosure. In other examples, the wireless communication manager 715 and/or at least some of its various sub-components may be combined with one or more other hardware components, including but not limited to an I/O component, a transceiver, another computing device, one or more other components described in the present disclosure, or a combination thereof, in accordance with one or more aspects of the present disclosure. The wireless communication manager 715 may be an example of aspects of the wireless communication manager described with reference to FIG. 1. The wireless communication manager 715 may include a network access device communication manager 735 and a fast switching manager 740.

The network access device communication manager 735 may be used to communicate with a first network access device using a first RAT, as described for example with reference to FIG. 3.

The fast switching manager 740 may be used to transmit, to a second network access device, a request to perform fast switching (e.g., with PDCP continuity or RLC continuity), from the first network access device to the second network access device, as described for example with reference to FIG. 3. The second network access device may use a second RAT. The fast switching manager 740 may also be used to receive, from the second network access device, a dual connectivity configuration for communicating with the second network access device, as described for example with reference to FIG. 3. In some examples, the request to perform fast switching may be transmitted to the second network access device in at least one of a MAC layer CE, a MAC layer message, RRC signaling, or a combination thereof.

The network access device communication manager 735 may also be used to communicate with the second network access device using the second RAT based at least in part on the dual connectivity configuration, as described for example with reference to FIG. 3.

In some examples, network access device communication manager 735 may be used to communicate with the second network access device based at least in part on a first PDCP context used while communicating with the first network access device using the first RAT or a second PDCP context based at least in part on the first PDCP context. In some examples, the first PDCP context may include a first PDCP sequence numbering, and the second PDCP context may include a second PDCP sequence numbering based at least in part on the first PDCP sequence numbering.

In some examples, the fast switching manager 740 may be used to determine to transmit the request to perform fast switching based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In some examples, the wireless communication manager 715 may be used to transmit a BSR to the first network access device or the second network access device. In some examples, the wireless communication manager 715 may be used to transmit a zero BSR to the first network access device before communicating with the second network access device. In some examples, the wireless communication manager 715 may be used to transmit a BSR with each packet transmission to the first network access device or the second network access device.

In some examples, the fast switching manager 740 may be used to transmit a scheduling request to the second network access device before transmitting the request to perform fast switching to the second network access device and to transmit, to the second network access device, a MAC layer CE indicating that the second network access device should not be in a CDRX mode during the fast switching.

In some examples, the fast switching manager 740 may be used to receive, from the first network access device or the second network access device, a request to perform fast switching.

The transmitter 720 may transmit data or control signals or information (i.e., transmissions) generated by other components of the apparatus 705, some or all of which may be associated with various information channels (e.g., data channels, control channels, etc.). In some examples, the transmitter 720 may be collocated with the receiver 710 in a transceiver. For example, the transmitter 720 and receiver 710 may be an example of aspects of the transceiver 1030 described with reference to FIG. 10. The transmitter 720 may include a single antenna or a set of antennas.

Figure 8:
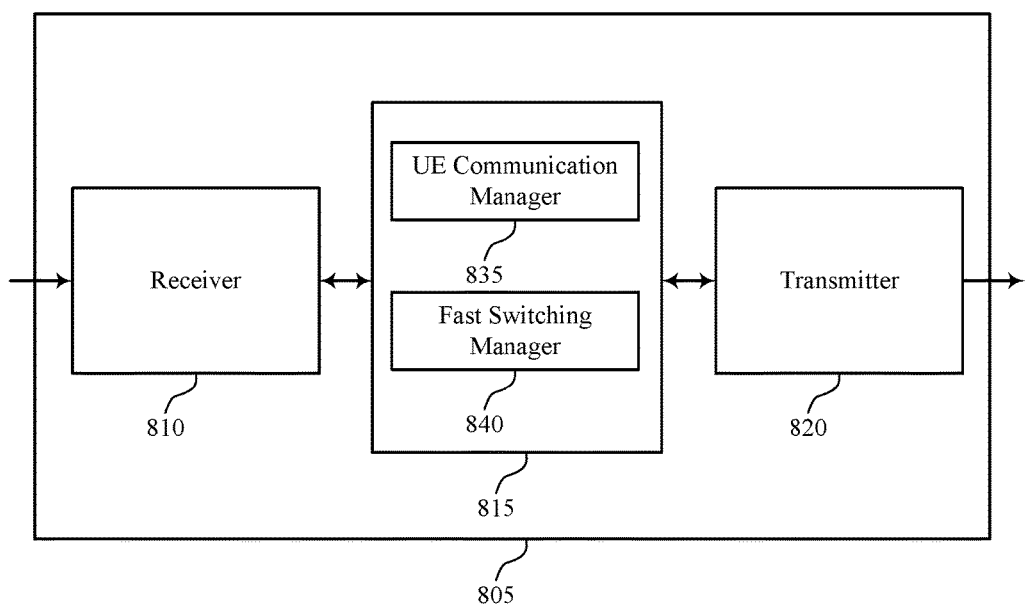

FIG. 8 shows a block diagram 800 of an apparatus 805 that support techniques for managing dual connectivity in an uplink, in accordance with one or more aspects of the present disclosure. The apparatus 805 may be an example of aspects of a network access device described with reference to FIGS. 1-4. The apparatus 805 may include a receiver 810, a wireless communication manager 815, and a transmitter 820. The apparatus 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the apparatus 805. The receiver 810 may include a single antenna or a set of antennas.

The wireless communication manager 815 and/or at least some of its various sub-components may be implemented in hardware, software executed by a processor, firmware, or any combination thereof. If implemented in software executed by a processor, the functions of the wireless communication manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless communication manager 815 and/or at least some of its various sub-components may be physically located at various positions, including being distributed such that portions of functions are implemented at different physical locations by one or more physical devices. In some examples, the wireless communication manager 815 and/or at least some of its various sub-components may be a separate and distinct component in accordance with one or more aspects of the present disclosure. In other examples, the wireless communication manager 815 and/or at least some of its various sub-components may be combined with one or more other hardware components, including but not limited to an I/O component, a transceiver, another computing device, one or more other components described in the present disclosure, or a combination thereof, in accordance with one or more aspects of the present disclosure. The wireless communication manager 815 may be an example of aspects of the wireless communication manager described with reference to FIG. 1. The wireless communication manager 815 may include a UE communication manager 835 and a fast switching manager 840.

The UE communication manager 835 may be used to communicate with a UE using a first RAT, as described for example with reference to FIG. 3.

The fast switching manager 840 may be used to transmit, to a second network access device, a first PDCP context used while communicating with the UE using the first RAT or a second PDCP context based at least in part on the first PDCP context, as described for example with reference to FIG. 3. The second network access device may use a second RAT.

In some examples, the fast switching manager 840 may be used to receive, from the second network access device, a request for a PDCP context of the UE. In these examples, the first PDCP context or the second PDCP context may be transmitted in response to the request for the PDCP context of the UE. In some examples, the first PDCP context may include a first PDCP sequence numbering, and the second PDCP context includes a second PDCP sequence numbering based at least in part on the first PDCP sequence numbering.

In some examples, the fast switching manager 840 may be used to transmit, to the UE, a request for the UE to perform fast switching. The request for the UE to perform fast switching may be based at least in part on an uplink throughput estimation, a downlink throughput estimation, a RSRQ measurement, a RSRP measurement, a number of HARQ repetitions, a RLC PER, a PDCP PER, an application type, an application metric, historic information on a first network access device (i.e., a network access device including the apparatus 805) or the second network access device, or a combination thereof.

In some examples, the wireless communication manager 815 may be used to receive from the UE, at the first network access device, a duplicate of a BSR transmitted form the UE to the second network access device. In some examples, the wireless communication manager 815 may be used to receive a zero BSR from the UE before the UE switches to communicating with the second network access device. In some examples, the wireless communication manager 815 may be used to receive, from the UE, a BSR with each packet transmission to the first network access device.

The transmitter 820 may transmit data or control signals or information (i.e., transmissions) generated by other components of the apparatus 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver 1150 described with reference to FIG. 11. The transmitter 820 may include a single antenna or a set of antennas.

Figure 9:
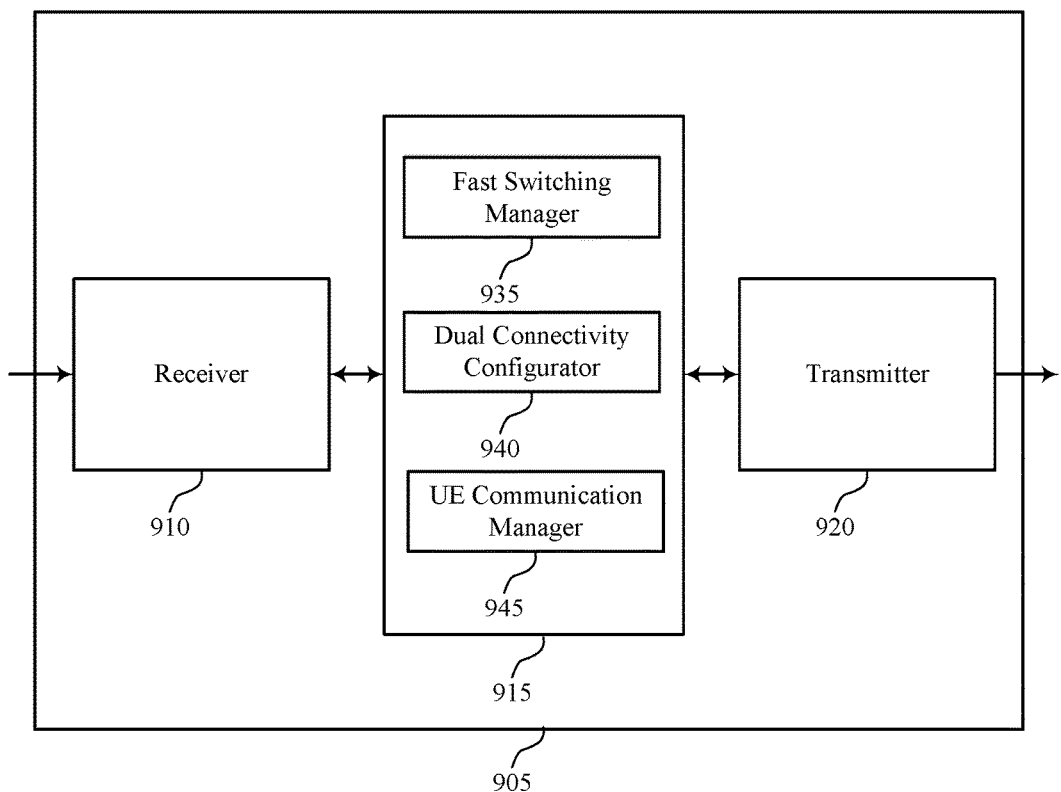

FIG. 9 shows a block diagram 900 of an apparatus 905 that support techniques for managing dual connectivity in an uplink, in accordance with one or more aspects of the present disclosure. The apparatus 905 may be an example of aspects of a network access device described with reference to FIGS. 1-4. The apparatus 905 may include a receiver 910, a wireless communication manager 915, and a transmitter 920. The apparatus 905 may also include a processor. Each of these components may be in communication with one another (e.g., via one or more buses).

The receiver 910 may receive data or control signals or information (i.e., transmissions), some or all of which may be associated with various information channels (e.g., data channels, control channels, etc.). Received signals or information, or measurements performed thereon, may be passed to other components of the apparatus 905. The receiver 910 may include a single antenna or a set of antennas.

The wireless communication manager 915 and/or at least some of its various sub-components may be implemented in hardware, software executed by a processor, firmware, or any combination thereof. If implemented in software executed by a processor, the functions of the wireless communication manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless communication manager 915 and/or at least some of its various sub-components may be physically located at various positions, including being distributed such that portions of functions are implemented at different physical locations by one or more physical devices. In some examples, the wireless communication manager 915 and/or at least some of its various sub-components may be a separate and distinct component in accordance with one or more aspects of the present disclosure. In other examples, the wireless communication manager 915 and/or at least some of its various sub-components may be combined with one or more other hardware components, including but not limited to an I/O component, a transceiver, another computing device, one or more other components described in the present disclosure, or a combination thereof, in accordance with one or more aspects of the present disclosure. The wireless communication manager 915 may be an example of aspects of the wireless communication manager described with reference to FIG. 1. The wireless communication manager 915 may include a fast switching manager 935, a dual connectivity configurator 940, and a UE communication manager 945.

The fast switching manager 935 may be used to receive, from a UE, a request to perform fast switching (e.g., with PDCP continuity or RLC continuity) from a second network access device to the first network access device (i.e., to a network access device including the apparatus 905), as described for example with reference to FIG. 3. The first network access device may use a first RAT, and the second network access device may use a second RAT. In some examples, the request to perform fast switching may be received from the UE in at least one of a MAC layer CE, a MAC layer message, RRC signaling, or a combination thereof. The fast switching manager 935 may also be used to receive, from the second network access device, a first PDCP context used while communicating with the UE using the second RAT or a second PDCP context based at least in part on the first PDCP context, as described for example with reference to FIG. 3.

The dual connectivity configurator 940 may be used to transmit, to the UE, a dual connectivity configuration for communicating with the first network access device, as described for example with reference to FIG. 3.

The UE communication manager 945 may be used to communicate with the UE using the first RAT based at least in part on the dual connectivity configuration, as described for example with reference to FIG. 3.

In some examples, the fast switching manager 935 may be used to transmit, to the second network access device, a request for a PDCP context of the UE. In these examples, the first PDCP context or the second PDCP context may be received in response to the request for the PDCP context of the UE.

In some examples, the wireless communication manager 915 may be used to receive from the UE, at the first network access device, a duplicate of a BSR transmitted form the UE to the second network access device. In some examples, the wireless communication manager 915 may be used to receive a BSR with each packet transmission from the UE.

In some examples, the fast switching manager 935 may be used to receive a scheduling request from the UE before receiving the request to perform fast switching with PDCP continuity and to receive, from the UE, a MAC layer CE or a MAC layer message indicating that the first network access device should not be in a CDRX mode during the fast switching with PDCP continuity.

The transmitter 920 may transmit data or control signals or information (i.e., transmissions) generated by other components of the apparatus 905, some or all of which may be associated with various information channels (e.g., data channels, control channels, etc.). In some examples, the transmitter 920 may be collocated with the receiver 910 in a transceiver. For example, the transmitter 920 and receiver 910 may be an example of aspects of the transceiver 1150 described with reference to FIG. 11. The transmitter 920 may include a single antenna or a set of antennas.

Figure 10:
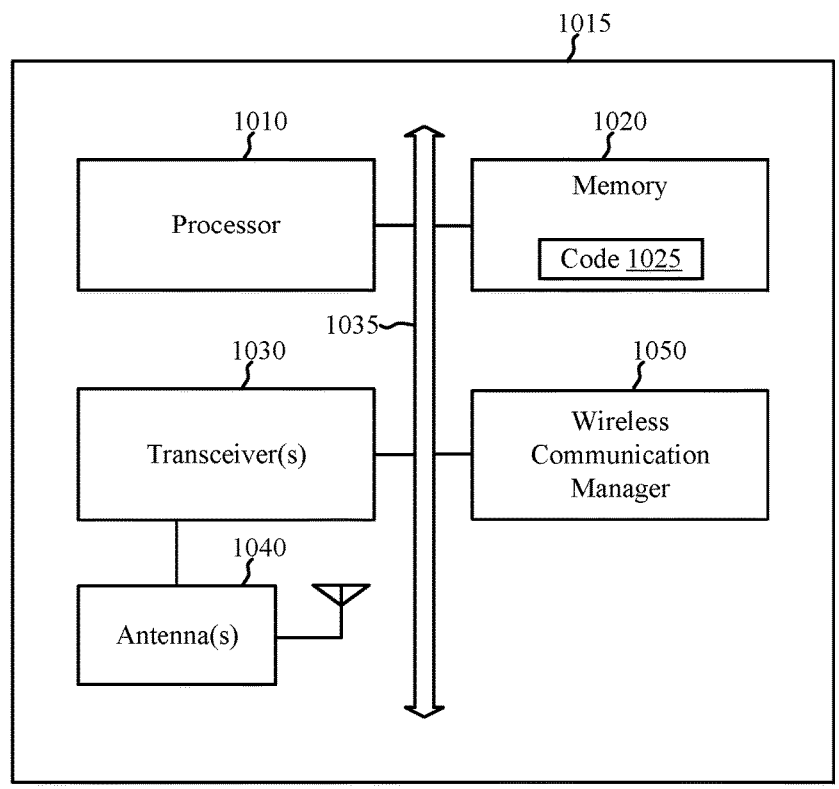
FIG. 10 shows a block diagram of a UE that supports techniques for managing dual connectivity in an uplink, in accordance with one or more aspects of the present disclosure.

FIG. 10 shows a block diagram 1000 of a UE 1015 that support techniques for managing dual connectivity in an uplink, in accordance with one or more aspects of the present disclosure. The UE 1015 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1015 may, in some examples, have an internal power supply (not shown), such as a small battery, to facilitate mobile operation. In some examples, the UE 1015 may be an example of aspects of one or more of the UEs or relay UEs described with reference to FIG. 1-4, or aspects of one or more of the apparatuses described with reference to FIGS. 5 and 7. The UE 1015 may be configured to implement at least some of the UE or apparatus techniques and functions described with reference to FIGS. 1-5 and 7.

The UE 1015 may include a processor 1010, a memory 1020, at least one transceiver (represented by transceiver(s) 1030), antennas 1040 (e.g., an antenna array), or a wireless communication manager 1050. Each of these components may be in communication with each other, directly or indirectly, over one or more buses 1035.

The memory 1020 may include random access memory (RAM) or read-only memory (ROM). The memory 1020 may store computer-readable, computer-executable code 1025 containing instructions that are configured to, when executed, cause the processor 1010 to perform various functions described herein related to wireless communication, including, for example, operation in one or more dual connectivity modes. Alternatively, the computer-executable code 1025 may not be directly executable by the processor 1010 but be configured to cause the UE 1015 (e.g., when compiled and executed) to perform various of the functions described herein.

The processor 1010 may include an intelligent hardware device, e.g., a central processing unit (CPU), a microcontroller, an ASIC, etc. The processor 1010 may process information received through the transceiver(s) 1030 or information to be sent to the transceiver(s) 1030 for transmission through the antennas 1040. The processor 1010 may handle, alone or in connection with the wireless communication manager 1050, one or more aspects of communicating over (or managing communications over) one or more radio frequency spectrum bands.

The transceiver(s) 1030 may include a modem configured to modulate packets and provide the modulated packets to the antennas 1040 for transmission, and to demodulate packets received from the antennas 1040. The transceiver(s) 1030 may, in some examples, be implemented as one or more transmitters and one or more separate receivers. The transceiver(s) 1030 may support communications in one or more radio frequency spectrum bands. The transceiver(s)

1030 may be configured to communicate bi-directionally, via the antennas 1040, with one or more network access devices or apparatuses, such as one of the network access devices described with reference to FIG. 1-4, or one of the apparatuses described with reference to FIGS. 6, 8, and 9.

The wireless communication manager 1050 may be configured to perform or control some or all of the UE or apparatus techniques or functions described with reference to FIGS. 1-5 and 7 related to wireless communication. The wireless communication manager 1050, or portions of it, may include a processor, or some or all of the functions of the wireless communication manager 1050 may be performed by the processor 1010 or in connection with the processor 1010. In some examples, the wireless communication manager 1050 may be an example of a wireless communication manager described with reference to FIGS. 1, 5, and 7.

Figure 11:
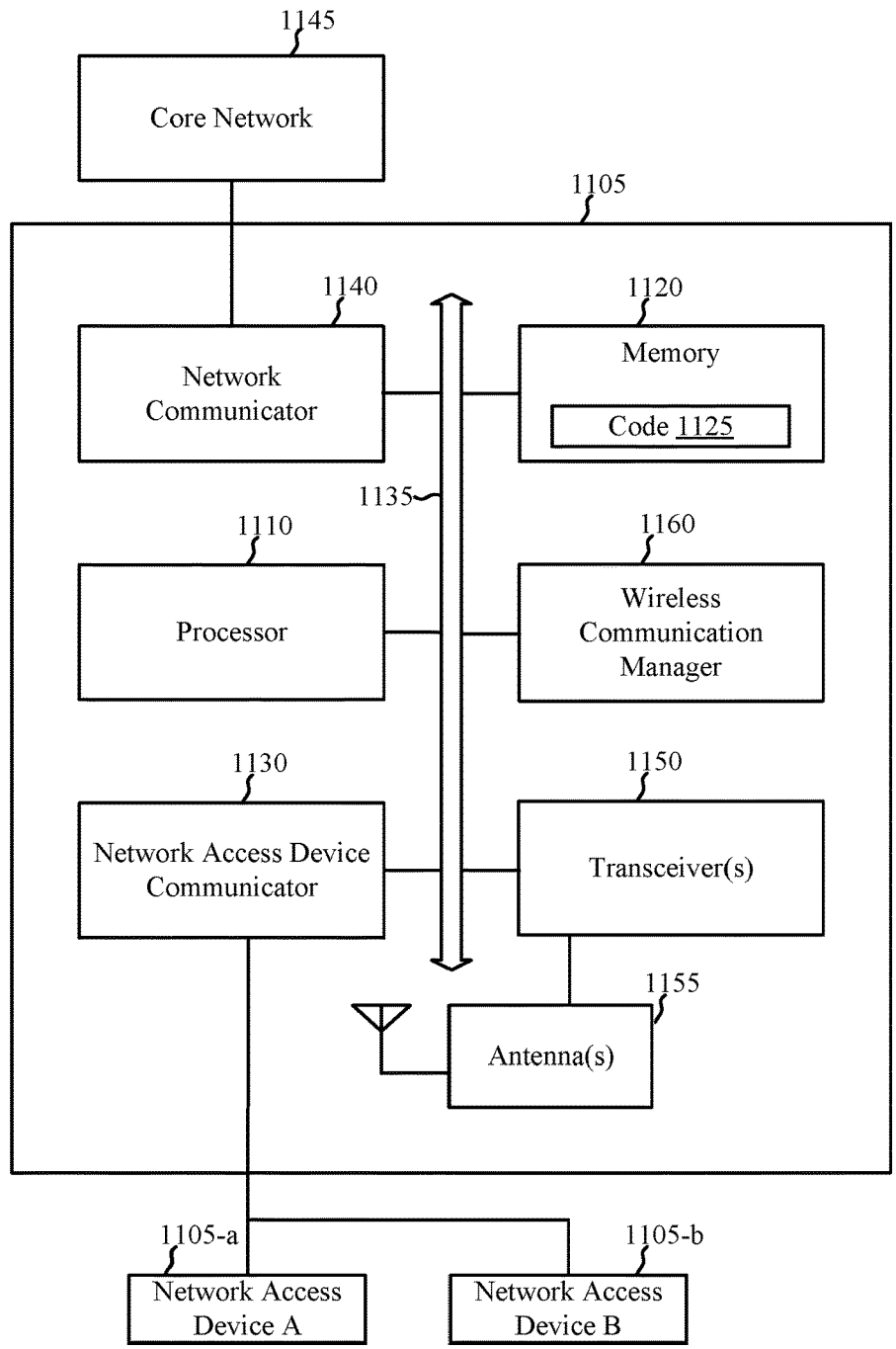
FIG. 11 shows a block diagram of a network access device that supports techniques for managing dual connectivity in an uplink, in accordance with one or more aspects of the present disclosure.

FIG. 11 shows a block diagram 1100 of a network access device 1105 that support techniques for managing dual connectivity in an uplink, in accordance with one or more aspects of the present disclosure. In some examples, the network access device 1105 may be an example of aspects of one or more of the network access devices (e.g., a radio head, a base station, a gNB, or an ANC) described with reference to FIG. 1-4, or aspects of one or more of the apparatuses described with reference to FIGS. 6, 8, and 9. The network access device 1105 may be configured to implement or facilitate at least some of the network access device techniques and functions described with reference to FIGS. 1-4, 6, 8, and 9.

The network access device 1105 may include a processor 1110, a memory 1120, at least one transceiver (represented by transceiver(s) 1150), antennas 1155 (e.g., an antenna array), or a wireless communication manager 1160. The network access device 1105 may also include one or more of a network access device communicator 1130 or a network communicator 1140. Each of these components may be in communication with each other, directly or indirectly, over one or more buses 1135.

The memory 1120 may include RAM or ROM. The memory 1120 may store computer-readable, computer-executable code 1125 containing instructions that are configured to, when executed, cause the processor 1110 to perform various functions described herein related to wireless communication, including, for example, the management of one or more dual connectivity modes for a UE. Alternatively, the computer-executable code 1125 may not be directly executable by the processor 1110 but be configured to cause the network access device 1105 (e.g., when compiled and executed) to perform various of the functions described herein.

The processor 1110 may include an intelligent hardware device, e.g., a CPU, a microcontroller, an ASIC, etc. The processor 1110 may process information received through the transceiver(s) 1150, the network access device communicator 1130, or the network communicator 1140. The processor 1110 may also process information to be sent to the transceiver(s) 1150 for transmission through the antennas 1155, or to the network access device communicator 1130 for transmission to one or more other network access devices (e.g., network access device 1105-a and network access device 1105-b), or to the network communicator 1140 for transmission to a core network 1145, which may be an example of one or more aspects of the core network 130 described with reference to FIG. 1. The processor 1110 may handle, alone or in connection with the wireless communication manager 1160, one or more aspects of communicating over (or managing communications over) one or more radio frequency spectrum bands.

The transceiver(s) 1150 may include a modem configured to modulate packets and provide the modulated packets to the antennas 1155 for transmission, and to demodulate packets received from the antennas 1155. The transceiver(s) 1150 may, in some examples, be implemented as one or more transmitters and one or more separate receivers. The transceiver(s) 1150 may support communications in one or more radio frequency spectrum bands. The transceiver(s) 1150 may be configured to communicate bi-directionally, via the antennas 1155, with one or more UEs or apparatuses, such as one of the UEs described with reference to FIGS. 1-4 and 10, or one of the apparatuses described with reference to FIGS. 5 and 7. The network access device 1105 may communicate with the core network 1145 through the network communicator 1140. The network access device 1105 may also communicate with other network access devices, such as the network access device 1105-a and the network access device 1105-b, using the network access device communicator 1130.

The wireless communication manager 1160 may be configured to perform or control some or all of the network access device or apparatus techniques or functions described with reference to FIGS. 1-4, 6, 8, and 9 related to wireless communication. The wireless communication manager 1160, or portions of it, may include a processor, or some or all of the functions of the wireless communication manager 1160 may be performed by the processor 1110 or in connection with the processor 1110. In some examples, the wireless communication manager 1160 may be an example of a wireless communication manager described with reference to FIGS. 1, 6, 8, and 9.

Figure 12:
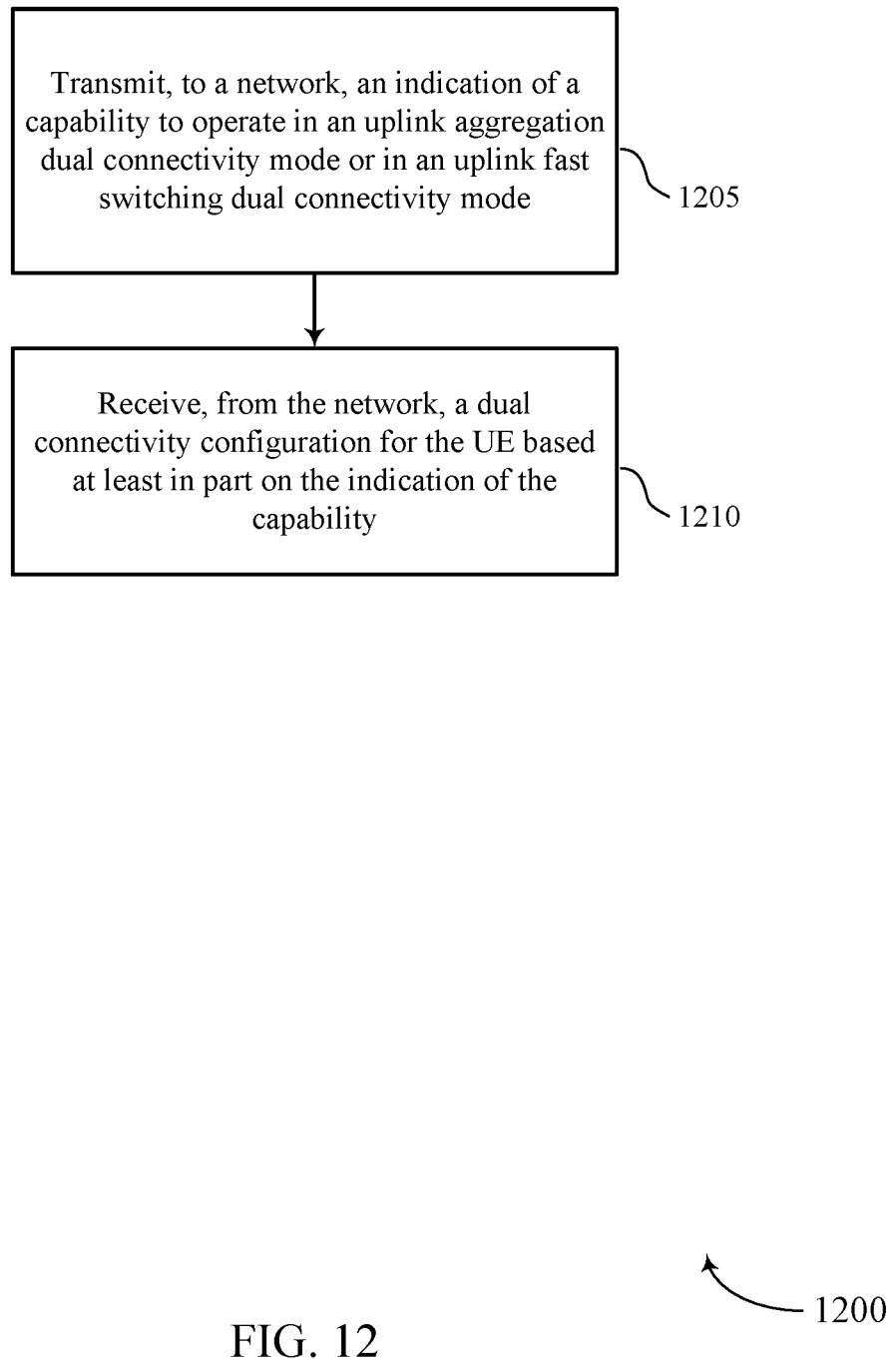
FIG. 12 is a flow chart illustrating an example of a method for dual connectivity in an uplink at a UE, in accordance with one or more aspects of the present disclosure.

FIG. 12 is a flow chart illustrating an example of a method 1200 for dual connectivity in an uplink at a UE, in accordance with one or more aspects of the present disclosure. For clarity, the method 1200 is described below with reference to aspects of one or more of the UEs described with reference to FIGS. 1-4 and 10, aspects of the apparatus described with reference to FIG. 5, or aspects of one or more of the wireless communication managers described with reference to FIGS. 1, 5, and 10. In some examples, a UE may execute one or more sets of codes to control the functional elements of the UE to perform the functions described below. Additionally or alternatively, the UE may perform one or more of the functions described below using special-purpose hardware.

At 1205, the method 1200 may include transmitting, to a network, an indication of a capability to operate in an uplink aggregation dual connectivity mode or in an uplink fast switching dual connectivity mode, as described for example with reference to FIG. 2 or 3. In some examples the uplink aggregation dual connectivity mode or the uplink fast switching dual connectivity mode include PDCP continuity or RLC continuity. In some examples, the indication of the capability may include at least one of a first indication of a supported aggregate uplink throughput, a second indication of whether an additional uplink mode is supported, a third indication of whether the uplink aggregation dual connectivity mode is supported, or a combination thereof. In certain examples, the operation(s) at 1205 may be performed using the capability indicator described with reference to FIG. 5.

At 1210, the method 1200 may include receiving, from the network, a dual connectivity configuration for the UE based at least in part on the indication of the capability, as described for example with reference to FIG. 2 or 3. In certain examples, the operation(s) at 1210 may be performed using the dual connectivity manager described with reference to FIG. 5.

In some examples of the method 1200, the received dual connectivity configuration may be based at least in part on the uplink aggregation dual connectivity mode and includes a configuration of a split bearer. The split bearer may be associated with a first network access device using a first RAT and a second network access device using a second RAT (e.g., a different RAT).

In some examples, the method 1200 may further include determining a first amount of data to be transmitted to the first network access device and a second amount of data to be transmitted to the second network access device. In some examples, the method 1200 may further include transmitting a first BSR of the UE over the split bearer, to the first network access device, based at least in part on the first amount of data; and transmitting a second BSR of the UE over the split bearer, to the second network access device, based at least in part on the second amount of data. In some examples, the method 1200 may further include transmitting a single BSR over the split bearer to the first network access device and the second network access device.

Figure 13:
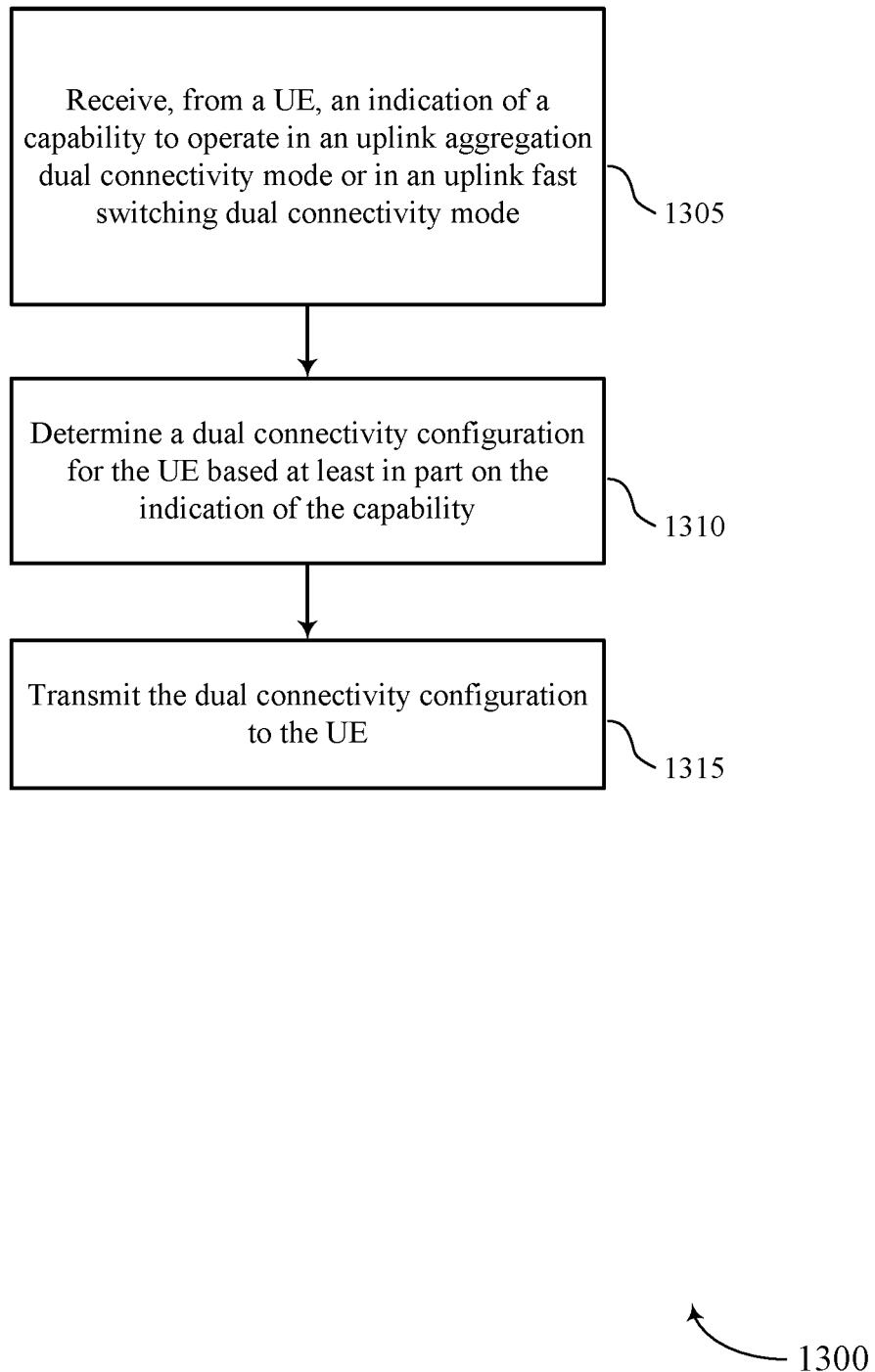
FIG. 13 is a flow chart illustrating an example of a method for dual connectivity in an uplink at a first network access device, in accordance with one or more aspects of the present disclosure.

FIG. 13 is a flow chart illustrating an example of a method 1300 for dual connectivity in an uplink at a first network access device, in accordance with one or more aspects of the present disclosure. For clarity, the method 1300 is described below with reference to aspects of one or more of the network access devices described with reference to FIGS. 1-4 and 11, aspects of the apparatus described with reference to FIG. 6, or aspects of one or more of the wireless communication managers described with reference to FIGS. 1, 6, and 11. In some examples, a first network access device may execute one or more sets of codes to control the functional elements of the first network access device to perform the functions described below. Additionally or alternatively, the first network access device may perform one or more of the functions described below using special-purpose hardware.

At 1305, the method 1300 may include receiving, from a UE, an indication of a capability to operate in an uplink aggregation dual connectivity mode or in an uplink fast switching dual connectivity mode, as described for example with reference to FIG. 2 or 3. In some examples the uplink aggregation dual connectivity mode or the uplink fast switching dual connectivity mode include PDCP continuity or RLC continuity. In some examples, the indication of the capability may include at least one of a first indication of a supported aggregate uplink throughput, a second indication of whether another uplink mode is supported, a third indication of whether the uplink aggregation dual connectivity mode is supported, or a combination thereof. In certain examples, the operation(s) at 1305 may be performed using the capability manager described with reference to FIG. 6.

At 1310, the method 1300 may include determining a dual connectivity configuration for the UE based at least in part on the indication of the capability, as described for example with reference to FIG. 2 or 3. In certain examples, the operation(s) at 1310 may be performed using the dual connectivity configurator described with reference to FIG. 6.

At 1315, the method 1300 may include transmitting the dual connectivity configuration to the UE, as described for example with reference to FIG. 2 or 3. In certain examples, the operation(s) at 1315 may be performed using the dual connectivity configurator described with reference to FIG. 6.

In some examples of the method 1300, the determined dual connectivity configuration may be based at least in part on the uplink aggregation dual connectivity mode and may include a configuration of a split bearer. The split bearer may be associated with the first network access device using a first RAT and a second network access device using a second RAT (e.g., a different RAT).

In some examples, the method 1300 may include receiving a first BSR of the UE, over the split bearer, at the first network access device, and receiving a second BSR of the UE from the second network access device. The first BSR of the UE may indicate a first amount of data to be transmitted to the first network access device, and the second BSR of the UE may indicate a second amount of data to be transmitted to the second network access device.

In some examples, the method 1300 may include receiving a BSR of the UE, over the split bearer, at the first network access device; and receiving a duplicate of the BSR of the UE from the second network access device.

Figure 14:
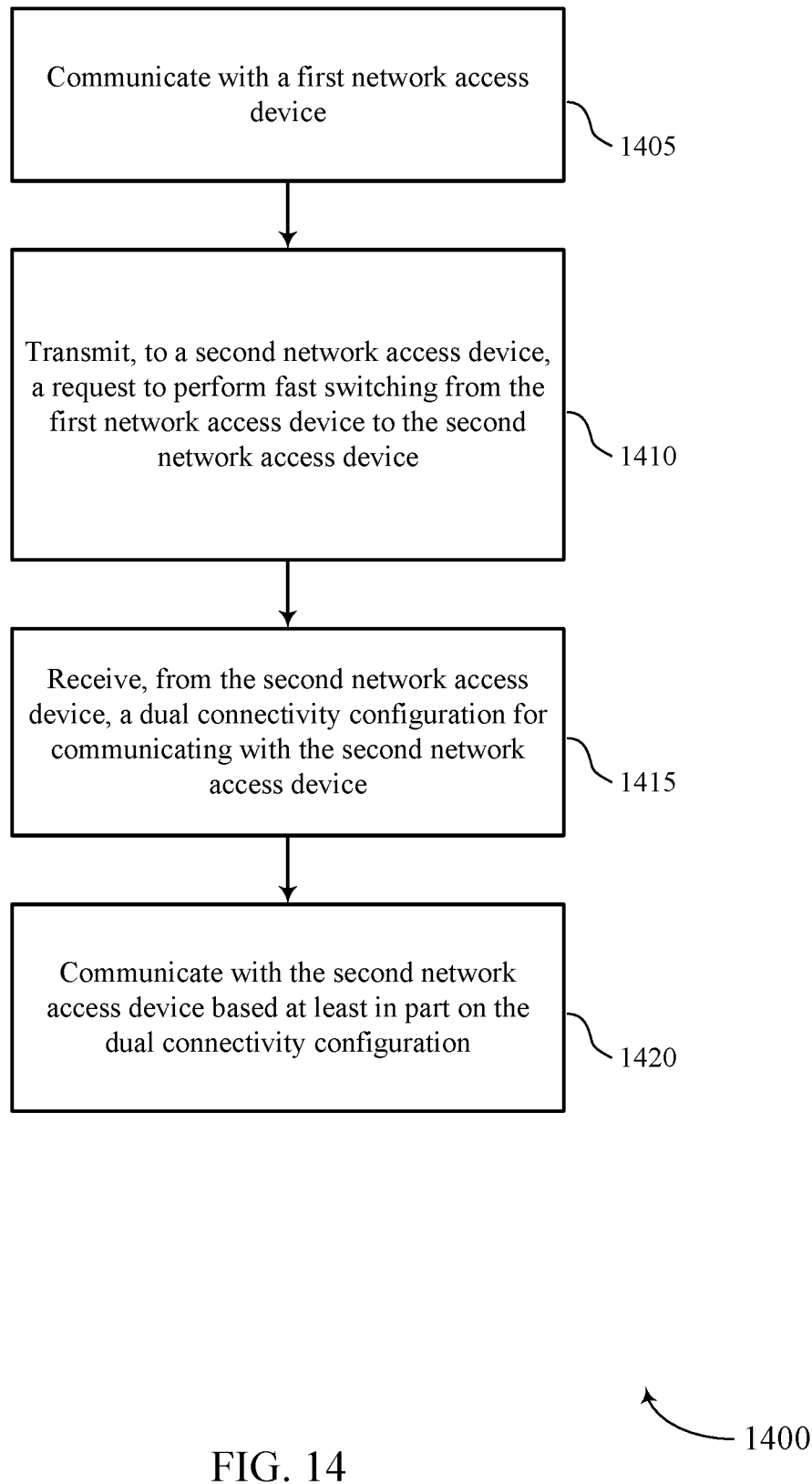
FIG. 14 is a flow chart illustrating an example of a method for dual connectivity in an uplink at a UE, in accordance with one or more aspects of the present disclosure.

FIG. 14 is a flow chart illustrating an example of a method 1400 for dual connectivity in an uplink at a UE, in accordance with one or more aspects of the present disclosure. For clarity, the method 1400 is described below with reference to aspects of one or more of the UEs described with reference to FIGS. 1-4 and 10, aspects of the apparatus described with reference to FIG. 7, or aspects of one or more of the wireless communication managers described with reference to FIGS. 1, 7, and 10. In some examples, a UE may execute one or more sets of codes to control the functional elements of the UE to perform the functions described below. Additionally or alternatively, the UE may perform one or more of the functions described below using special-purpose hardware.

At 1405, the method 1400 may include communicating with a first network access device, as described for example with reference to FIG. 3. In some examples, the communicating at 1405 may include communications using a first RAT. In certain examples, the operation(s) at 1405 may be performed using the network access device communication manager described with reference to FIG. 7.

At 1410, the method 1400 may include transmitting, to a second network access device, a request to perform fast switching from the first network access device to the second network access device, as described for example with reference to FIG. 3. In some examples the fast switching may include PDCP continuity or RLC continuity. The second network access device may use a second RAT (e.g., a different RAT). In certain examples, the operation(s) at 1410 may be performed using the fast switching manager described with reference to FIG. 7.

At 1415, the method 1400 may include receiving, from the second network access device, a dual connectivity configuration for communicating with the second network access device, as described for example with reference to FIG. 3. In certain examples, the operation(s) at 1415 may be performed using the fast switching manager described with reference to FIG. 7.

At 1420, the method 1400 may include communicating with the second network access device based at least in part on the dual connectivity configuration, as described for example with reference to FIG. 3. In some examples, the communicating at 1420 may include communications using the second RAT. In certain examples, the operation(s) at 1420 may be performed using the network access device communication manager described with reference to FIG. 7.

In some examples, the method 1400 may include communicating with the second network access device based at least in part on a first PDCP context used while communicating with the first network access device using the first RAT, or a second PDCP context based at least in part on the first PDCP context. In some examples, the first PDCP context may include a first PDCP sequence numbering, and the second PDCP context may include a second PDCP sequence numbering based at least in part on the first PDCP sequence numbering.

In some examples, the method 1400 may include determining to transmit the request to perform fast switching with PDCP continuity based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In some examples, the method 1400 may include transmitting a BSR to the first network access device or the second network access device. In some examples, the method 1400 may include transmitting a zero BSR to the first network access device before communicating with the second network access device. In some examples, the method 1400 may include transmitting a BSR with each packet transmission to the first network access device or the second network access device.

In some examples, the method 1400 may include transmitting a scheduling request to the second network access device before transmitting the request to perform fast switching with PDCP continuity to the second network access device; and transmitting, to the second network access device, a MAC layer CE or a MAC layer message indicating that the second network access device should not be in a CDRX mode during the fast switching.

In some examples of the method, the request to perform fast switching may be transmitted to the second network access device in at least one of a MAC layer CE, a MAC layer message, RRC signaling, or a combination thereof.

In some examples, the method 1400 may include receiving, from the first network access device or the second network access device, a request to perform fast switching with PDCP continuity.

Figure 15:
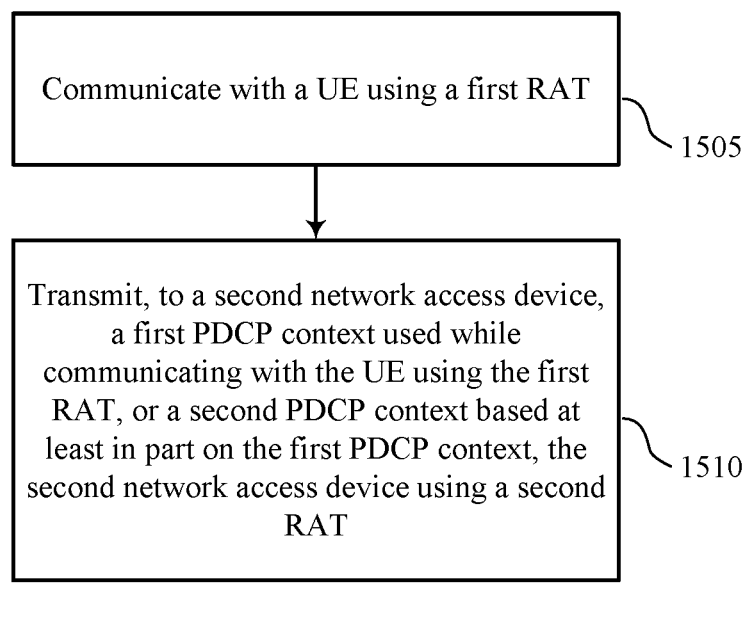
FIG. 15 is a flow chart illustrating an example of a method for dual connectivity in an uplink at a first network access device, in accordance with one or more aspects of the present disclosure.

FIG. 15 is a flow chart illustrating an example of a method 1500 for dual connectivity in an uplink at a first network access device, in accordance with one or more aspects of the present disclosure. For clarity, the method 1500 is described below with reference to aspects of one or more of the network access devices described with reference to FIGS. 1-4 and 11, aspects of the apparatus described with reference to FIG. 8, or aspects of one or more of the wireless communication managers described with reference to FIGS. 1, 8, and 11. In some examples, a first network access device may execute one or more sets of codes to control the functional elements of the first network access device to perform the functions described below. Additionally or alternatively, the first network access device may perform one or more of the functions described below using special-purpose hardware.

At 1505, the method 1500 may include communicating with a UE using a first RAT, as described for example with reference to FIG. 3. In certain examples, the operation(s) at 1505 may be performed using the UE communication manager described with reference to FIG. 8.

At 1510, the method 1500 may include transmitting, to a second network access device, a first PDCP context used while communicating with the UE using the first RAT, or a second PDCP context based at least in part on the first PDCP context, as described for example with reference to FIG. 3. The second network access device may use a second RAT.

In certain examples, the operation(s) at 1510 may be performed using the fast switching manager described with reference to FIG. 8.

In some examples, the method 1500 may include receiving, from the second network access device, a request for a PDCP context of the UE. In these examples, the first PDCP context or the second PDCP context may be transmitted in response to the request for the PDCP context of the UE. In some examples of the method 1500, the first PDCP context may include a first PDCP sequence numbering, and the second PDCP context includes a second PDCP sequence numbering based at least in part on the first PDCP sequence numbering.

In some examples, the method 1500 may include transmitting, to the UE, a request for the UE to perform fast switching with PDCP continuity. The request for the UE to perform fast switching with PDCP continuity may be based at least in part on an uplink throughput estimation, a downlink throughput estimation, a RSRQ measurement, a RSRP measurement, a number of HARQ repetitions, a RLC PER, a PDCP PER, an application type, an application metric, historic information on the first network access device or the second network access device, or a combination thereof.

In some examples, the method 1500 may include receiving from the UE, at the first network access device, a duplicate of a BSR transmitted form the UE to the second network access device. In some examples, the method 1500 may include receiving a zero BSR from the UE before the UE switches to communicating with the second network access device. In some examples, the method 1500 may include receiving, from the UE, a BSR with each packet transmission to the first network access device.

Figure 16:
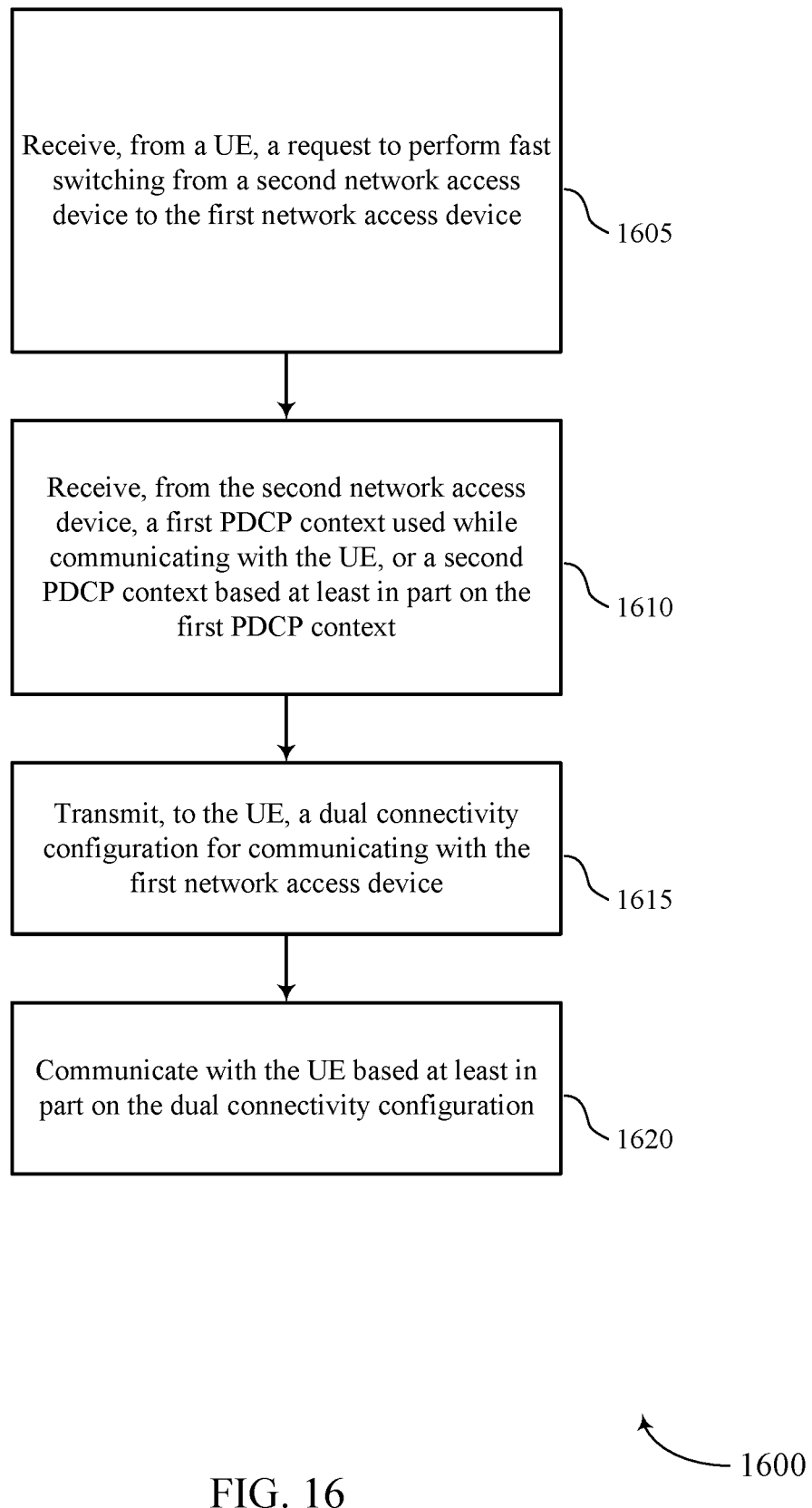
FIG. 16 is a flow chart illustrating an example of a method for dual connectivity in an uplink at a first network access device, in accordance with one or more aspects of the present disclosure.

FIG. 16 is a flow chart illustrating an example of a method 1600 for dual connectivity in an uplink at a first network access device, in accordance with one or more aspects of the present disclosure. For clarity, the method 1600 is described below with reference to aspects of one or more of the network access devices described with reference to FIGS. 1-4 and 11, aspects of the apparatus described with reference to FIG. 9, or aspects of one or more of the wireless communication managers described with reference to FIGS. 1, 9, and 11. In some examples, a first network access device may execute one or more sets of codes to control the functional elements of the first network access device to perform the functions described below. Additionally or alternatively, the first network access device may perform one or more of the functions described below using special-purpose hardware.

At 1605, the method 1600 may include receiving, from a UE, a request to perform fast switching from a second network access device to the first network access device, as described for example with reference to FIG. 3. In some examples the fast switching may include PDCP continuity or RLC continuity. In some examples the first network access device may use a first RAT, and the second network access device may use a second RAT (e.g., a different RAT). In certain examples, the operation(s) at 1605 may be performed using the fast switching manager described with reference to FIG. 9.

At 1610, the method 1600 may include receiving, from the second network access device, a first PDCP context used while communicating with the UE (e.g., while using the second RAT), or a second PDCP context based at least in part on the first PDCP context, as described for example with reference to FIG. 3. In certain examples, the operation(s) at

1610 may be performed using the fast switching manager described with reference to FIG. 9.

At 1615, the method 1600 may include transmitting, to the UE, a dual connectivity configuration for communicating with the first network access device, as described for example with reference to FIG. 3. In certain examples, the operation(s) at 1615 may be performed using the dual connectivity configurator described with reference to FIG. 9.

At 1620, the method 1600 may include communicating with the UE (e.g., using the first RAT) based at least in part on the dual connectivity configuration, as described for example with reference to FIG. 3. In certain examples, the operation(s) at 1620 may be performed using the UE communication manager described with reference to FIG. 9.

In some examples, the method 1600 may include transmitting, to the second network access device, a request for a PDCP context of the UE. In these examples, the first PDCP context or the second PDCP context may be received in response to the request for the PDCP context of the UE.

In some examples, the method 1600 may include receiving from the UE, at the first network access device, a duplicate of a BSR transmitted form the UE to the second network access device. In some examples, the method 1600 may include receiving a BSR with each packet transmission from the UE.

In some examples, the method 1600 may include receiving a scheduling request from the UE before receiving the request to perform fast switching with PDCP continuity; and receiving, from the UE, a MAC layer CE or a MAC layer message indicating that the first network access device should not be in a CDRX mode during the fast switching with PDCP continuity.

In some examples of the method 1600, the request to perform fast switching with PDCP continuity may be received from the UE in at least one of a MAC layer CE, a MAC layer message, RRC signaling, or a combination thereof.

The methods 1200, 1300, 1400, 1500, and 1600 described with reference to FIGS. 12-16 may provide for wireless communication. It should be noted that the methods described in FIGS. 12-16 are example implementations of some of the techniques described in the present disclosure, and the operations of the methods may be rearranged, combined with other operations of the same or different method(s), or otherwise modified, such that other implementations are possible. Operations may also be added to the methods.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication at a user equipment (UE), comprising:
   transmitting, to a network, an indication of a capability to operate in an uplink fast switching dual connectivity mode;
   receiving, from the network, a dual connectivity configuration for the UE based at least in part on the indication of the capability, wherein the received dual connectivity configuration includes a configuration of a fast switching bearer simultaneously configured between the UE and a first network access device and between the UE and a second network access device; and
   transmitting, to the first network access device or the second network access device, a medium access control (MAC) layer message indicating that the first network access device or the second network access device should not be in a connected mode discontinuous reception (CDRX) mode during fast switching.

2. The method of claim 1, wherein the uplink fast switching dual connectivity mode includes packet data convergence protocol (PDCP) continuity or radio link control (RLC) protocol continuity.

3. The method of claim 1, further comprising:
   receiving, from the network, a request to perform fast switching from a first network access device to a second network access device, based at least in part on the indication of the capability.

4. The method of claim 3, wherein the request to perform fast switching is received in at least one of:
   a medium access control (MAC) layer message, radio resource control (RRC) signaling, or a combination thereof.

5. The method of claim 1, wherein the indication of the capability comprises at least one of:
   a first indication of a supported aggregate uplink throughput, a second indication of whether an additional uplink mode is supported, or a combination thereof.

6. The method of claim 1, further comprising:
   transmitting a single buffer status report (BSR) over the fast switching bearer to the first network access device and the second network access device.

7. The method of claim 1, wherein the fast switching bearer is associated with communications via the first network access device using a first radio access technology (RAT) and communications via the second network access device using a second RAT that is different from the first RAT.

8. A method of wireless communication at a first network access device, comprising:
   receiving, from a user equipment (UE), an indication of a capability to operate in an uplink fast switching dual connectivity mode;
   determining a dual connectivity configuration for the UE based at least in part on the indication of the capability, wherein the dual connectivity configuration includes a configuration of a fast switching bearer simultaneously configured between the UE and the first network access device and between the UE and a second network access device;
   transmitting the dual connectivity configuration to the UE;
   receiving, from the UE, a medium access control (MAC) layer message indicating that the first network access device should not be in a connected mode discontinuous reception (CDRX) mode during fast switching.

9. The method of claim 8, wherein the uplink fast switching dual connectivity mode includes packet data convergence protocol (PDCP) continuity or radio link control (RLC) protocol continuity.

10. The method of claim 8, further comprising:
    transmitting, to the UE, a request to perform fast switching to a second network access device.

11. The method of claim 10, wherein the request to perform fast switching is transmitted in at least one of:
    a medium access control (MAC) layer message, radio resource control (RRC) signaling, or a combination thereof.

12. The method of claim 8, wherein the indication of the capability comprises at least one of:
    a first indication of a supported aggregate uplink throughput, a second indication of whether an additional uplink mode is supported, or a combination thereof.

13. The method of claim 8, further comprising:
receiving a buffer status report (BSR) of the UE, over the fast switching bearer, at the first network access device; and
receiving a duplicate of the BSR of the UE from the second network access device.

14. The method of claim 8, wherein the fast switching bearer is associated with communications via the first network access device using a first radio access technology (RAT) and communications via the second network access device using a second RAT that is different from the first RAT.

15. A method of wireless communication at a user equipment (UE), comprising:
communicating with a first network access device;
transmitting a scheduling request to a second network access device before transmitting a request to perform fast switching to the second network access device;
transmitting, to the second network access device, a medium access control (MAC) layer message indicating the second network access device should not be in a connected mode discontinuous reception (CDRX) mode during the fast switching;
transmitting, to the second network access device, a request to perform fast switching from the first network access device to the second network access device;
receiving, from the second network access device, a dual connectivity configuration for communicating with the second network access device, wherein the received dual connectivity configuration includes a configuration of a fast switching bearer simultaneously configured between the UE and the first network access device and between the UE and the second network access device; and
communicating with the second network access device based at least in part on the dual connectivity configuration.

16. The method of claim 15, wherein the fast switching includes packet data convergence protocol (PDCP) continuity or radio link control (RLC) protocol continuity.

17. The method of claim 15, further comprising:
communicating with the second network access device based at least in part on: a first PDCP context and sequence numbering, used while communicating with the first network access device, or a second PDCP context and sequence numbering, based at least in part on the first PDCP context and sequence numbering.

18. The method of claim 15, further comprising:
determining to transmit the request to perform fast switching based at least in part on: an uplink throughput estimation, a downlink throughput estimation, a reference signal receive quality (RSRQ) measurement, a reference signal receive power (RSRP) measurement, a number of hybrid automatic repeat request (HARD) repetitions, a radio link control (RLC) packer error rate (PER), a PDCP PER, an application type, an application metric, historic information on the first network access device or the second network access device, or a combination thereof.

19. The method of claim 15, further comprising:
transmitting a single buffer status report (BSR) to the first network access device and the second network access device.

20. The method of claim 15, further comprising:
transmitting a zero buffer status report (BSR) to the first network access device before communicating with the second network access device.

21. The method of claim 15, further comprising:
transmitting a buffer status report (BSR) with each packet transmission to the first network access device or the second network access device.

22. The method of claim 15, wherein the request to perform fast switching is transmitted to the second network access device in at least one of:
a medium access control (MAC) layer message, radio resource control (RRC) signaling, or a combination thereof.

23. A method of wireless communication at a first network access device, comprising:
receiving a scheduling request from a user equipment (UE);
receiving, from the UE, a medium access control (MAC) layer message indicating that the first network access device should not be in a connected mode discontinuous reception (CDRX) mode during a fast switching;
receiving, from the UE, a request to perform the fast switching from a second network access device to the first network access device after receiving the scheduling request from the UE;
receiving, from the second network access device, a first PDCP context, or a second PDCP context based at least in part on the first PDCP context;
transmitting, to the UE, a dual connectivity configuration for communicating with the first network access device, wherein the dual connectivity configuration includes a configuration of a fast switching bearer simultaneously configured between the UE and the first network access device and between the UE and the second network access device; and
communicating with the UE based at least in part on the dual connectivity configuration.

24. The method of claim 23, wherein the fast switching includes packet data convergence protocol (PDCP) continuity or radio link control (RLC) protocol continuity.

25. The method of claim 23, further comprising:
transmitting, to the second network access device, a request for a PDCP context of the UE;
wherein the first PDCP context or the second PDCP context is received in response to the request for the PDCP context of the UE.

26. The method of claim 23, further comprising:
receiving from the UE, at the first network access device, a duplicate of a buffer status report (BSR) transmitted, from the UE, to the second network access device.

27. The method of claim 23, further comprising:
receiving a buffer status report (BSR) with each packet transmission from the UE.

28. The method of claim 23, wherein the request to perform fast switching is received from the UE in at least one of:
a medium access control (MAC) layer message, radio resource control (RRC) signaling, or a combination thereof.

* * * * *